United States Patent
Nanko et al.

(10) Patent No.: US 6,860,171 B1
(45) Date of Patent: Mar. 1, 2005

(54) DRIVE MECHANISM FOR A BICYCLE TRANSMISSION ASSIST MECHANISM

(75) Inventors: Yoshiaki Nanko, Sakai (JP); Masahiro Yamanaka, Izumisano (JP); Toshio Tetsuka, Sakai (JP)

(73) Assignee: Shimano, Inc., Sakai (JP)

( * ) Notice: Subject to any disclaimer, the term of this patent is extended or adjusted under 35 U.S.C. 154(b) by 0 days.

(21) Appl. No.: 09/474,916

(22) Filed: Dec. 29, 1999

(51) Int. Cl.[7] .............................................. G05G 1/14
(52) U.S. Cl. ..................... 74/594.1; 74/594.2; 474/160
(58) Field of Search ................................ 474/160, 162, 474/152, 153, 156, 165; 74/594.1, 594.2, 594.3, 594.4, 594.5; 475/259, 260, 261; 188/24.17

(56) References Cited

U.S. PATENT DOCUMENTS

| | | | | |
|---|---|---|---|---|
| 607,658 A | * | 7/1898 | Guiles ........................ 74/594.2 |
| 4,030,774 A | | 6/1977 | Foster ......................... 280/261 |
| 4,134,481 A | * | 1/1979 | Calderazzo .............. 188/24.17 |
| 4,218,931 A | * | 8/1980 | Tritenne ...................... 474/165 |
| 4,630,503 A | * | 12/1986 | Liu ......................... 74/594.1 X |
| 5,083,991 A | * | 1/1992 | Yang ........................... 475/259 |
| 5,205,794 A | * | 4/1993 | Browning ................... 474/160 |
| 5,358,451 A | | 10/1994 | Lacombe et al. ............. 474/78 |
| 5,609,536 A | * | 3/1997 | Hsu ............................ 474/160 |
| 5,852,954 A | * | 12/1998 | Yamanaka ................. 74/594.1 |
| 5,904,072 A | * | 5/1999 | Yamanaka .............. 474/160 X |
| 5,947,852 A | * | 9/1999 | Moretz ................... 474/160 X |
| 6,058,804 A | * | 5/2000 | Chang ........................ 74/594.1 |
| 6,085,613 A | * | 7/2000 | Niculescu .............. 74/594.1 X |

FOREIGN PATENT DOCUMENTS

| | | | | |
|---|---|---|---|---|
| FR | 404195 | * | 6/1909 | ................ 74/594.2 |
| FR | 1028488 | * | 5/1953 | ................ 74/594.1 |
| GB | 4599 | * | of 1899 | ................ 74/594.1 |
| JP | 5069876 A | * | 3/1993 | |

* cited by examiner

Primary Examiner—Marcus Charles
(74) Attorney, Agent, or Firm—James A. Deland

(57) ABSTRACT

A drive mechanism for a bicycle transmission assist mechanism includes a crank arm having a drive member. The drive member includes a first abutment facing a forward rotational direction of the crank arm and a non-concave sloped surface facing a rearward rotational direction of the crank arm.

46 Claims, 25 Drawing Sheets

DRIVE MECHANISM FOR A BICYCLE TRANSMISSION ASSIST MECHANISM

The present invention is directed to control devices for bicycle transmissions and, more particularly, to an apparatus that uses rotational power from a rotating crank, axle or some other member to assist the operation of the bicycle transmission.

A typical bicycle transmission is operated by a shift operating wire connected between the transmission and a manually operated shift operating device mounted on the handlebar. The rider operates the shift operating device to selectively pull or release the shift operating wire which, in turn, operates the transmission in the desired manner.

One of the goals of bicycle transmission design is to make the transmission easy to operate with a minimum amount of effort. This involves minimizing the force needed to operate the shift operating device as well as minimizing the amount of unnecessary movement of the shift operating device. In the case of bicycle transmissions such as derailleurs which are used to shift a chain from one sprocket to another, the amount of force needed to derail the chain from one sprocket and move it to another can be quite large, especially when the destination sprocket is substantially larger than the originating sprocket and the rider is exerting substantial pedaling force on the chain. The necessary operating force can be reduced by operating the shift operating device when only a small pedaling force is being applied to the chain, but that requires the rider to consciously alter his or her pedaling technique and/or consciously operate the shift operating device only when a small pedaling force is being applied to the chain. That can be very distracting, especially in a racing environment. Also, the actuation ratio of some derailleurs may be somewhat large. Consequently, the shift operating wire must move a substantial distance to fully move the chain from one sprocket to another, thus requiring the rider to move the shift operating device by a correspondingly large amount.

SUMMARY OF THE INVENTION

The present invention is directed to an assist device for shifting a bicycle transmission wherein very little force is needed to operate the transmission, the shift operating wire needs to be pulled or released only by a very small amount, and the assist device automatically determines when to perform the shifting operation. More specifically, the present invention is directed to a drive mechanism that operates such an assist device.

In one embodiment of the present invention, a drive mechanism for a bicycle transmission assist mechanism includes a crank arm having a crank axle mounting hole and a drive member. The drive member includes a first abutment facing a forward rotational direction of the crank arm and a non-concave sloped surface facing a rearward rotational direction of the crank arm.

In a more specific embodiment, the drive member comprises an annular drive ring mounted coaxial with the crank axle mounting hole. The first abutment is substantially perpendicular to an outer peripheral surface of the crank arm, and the first sloped surface has an arcuate shape. Preferably, the outer peripheral surface of the drive ring at the location of intersection with the abutment extends at a constant radius of curvature for more than 20°.

DETAILED DESCRIPTION OF THE EMBODIMENTS

Figure 1:
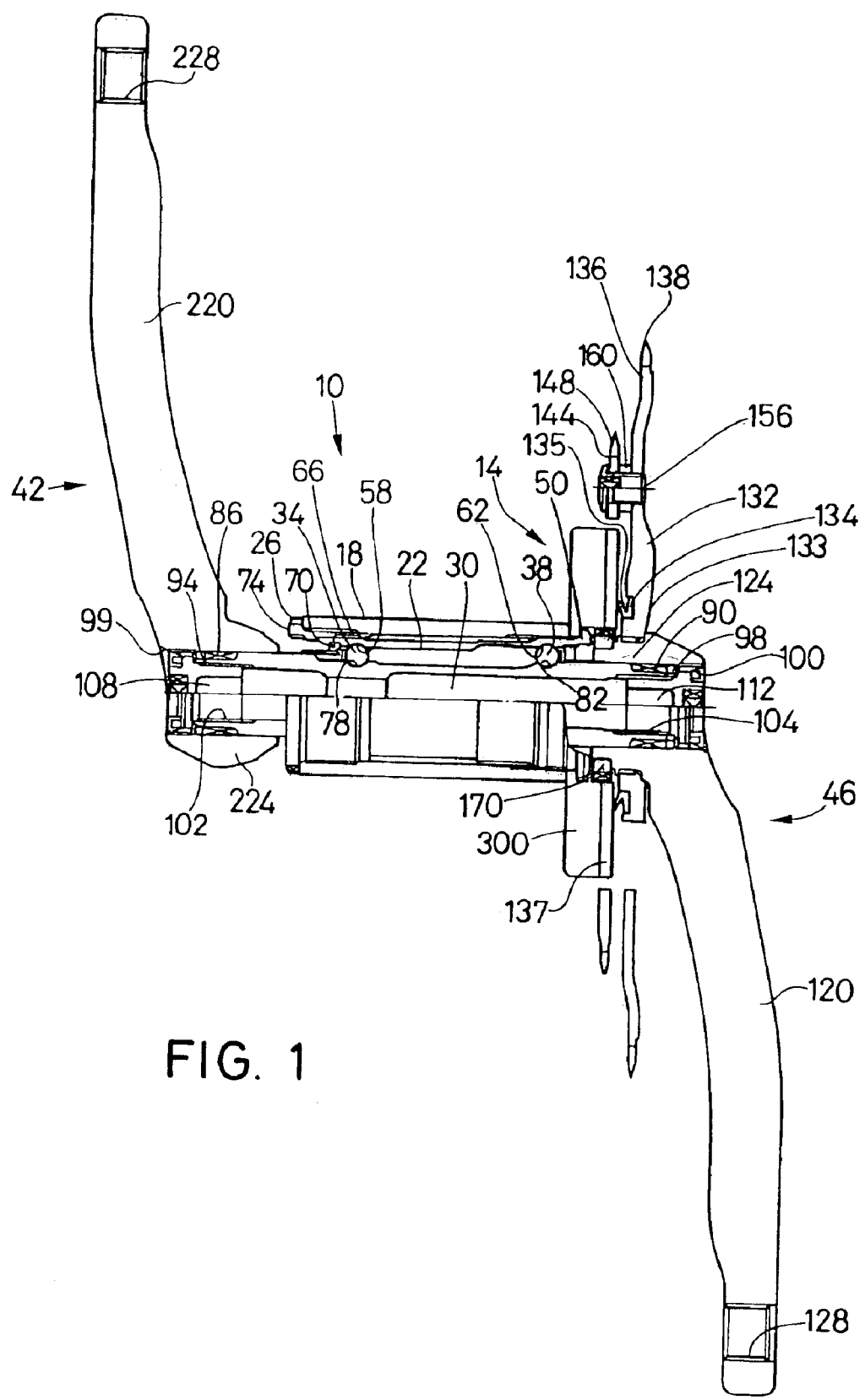
FIG. 1 is a partial cross sectional view of a bicycle bottom bracket assembly that incorporates a particular embodiment of an assisting apparatus according to the present invention for shifting a bicycle transmission.

FIG. 1 is a partial cross sectional view of a bicycle bottom bracket assembly 10 that incorporates a particular embodiment of an assisting apparatus 14 according to the present invention for shifting a bicycle transmission. Bottom bracket assembly 10 includes a bottom bracket shell 18 that is mounted to a typical bicycle frame (not shown), a tubular axle supporting sleeve 22, a sleeve coupler 26, an axle 30, ball bearings 34 and 38, and crank arm assemblies 42 and 46. Axle supporting sleeve 22 has a radially outwardly extending flange 50 on a first end thereof for retaining a mounting member 300 of assisting apparatus 14 to bottom bracket shell 18, bearing surfaces 58 and 62 for engaging ball bearings 34 and 38, respectively, and an outer peripheral surface 66 at a second end for engaging an inner peripheral surface 70 of sleeve coupler 26. Sleeve coupler 26 includes a radially outwardly extending flange 74 for engaging the side of bottom bracket shell 18.

In this embodiment, axle 30 is a substantially hollow tubular member having bearing surfaces 78 and 82 for engaging ball bearings 34 and 38, respectively, splines 86 and 90 for engaging complementary splines 94 and 98 formed on the inner peripheral surfaces of the crank axle mounting holes 99 and 100 in crank arm assemblies 42 and 46, respectively, and threaded inner peripheral surfaces 102 and 104 for engaging threaded bolts 108 and 112, respectively, that mount crank arm assemblies 42 and 46 to axle 30. Thus, axle 30 and crank arm assemblies 42 and 46 are rotatably supported within bottom bracket shell 18 by ball bearings 34 and 38.

Figure 2A:
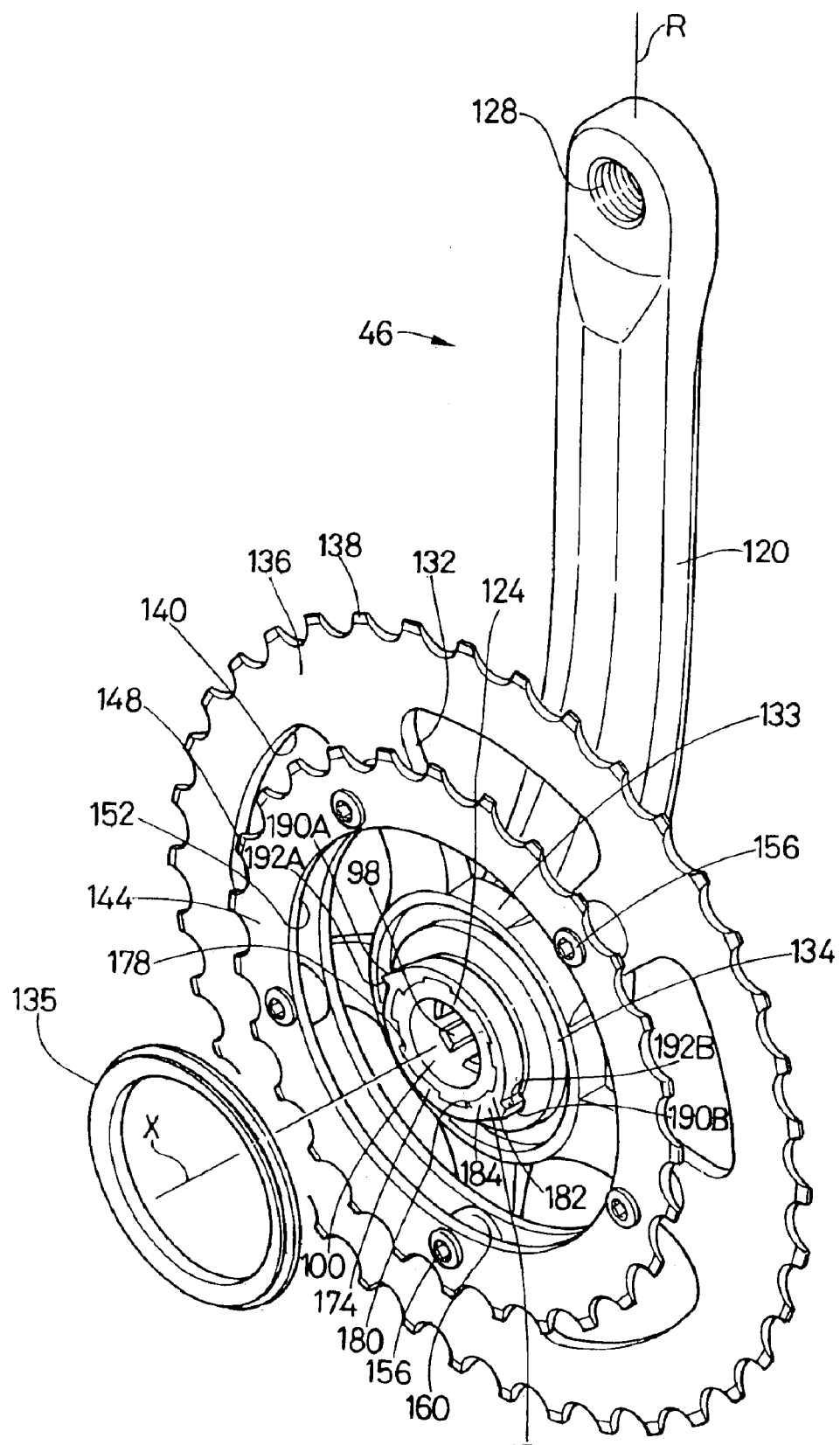
FIG. 2A is an oblique view of a particular embodiment of a right side crank arm assembly according to the present invention.

As shown in FIGS. 1 and 2A, crank arm assembly 46 includes an elongated crank arm body 120, a crank axle mounting boss 124 at the first end having an inner peripheral surface defining the crank axle mounting hole 100 and splines 98, and a threaded pedal mounting hole 128 on the second end. A plurality of, e.g., five sprocket mounting members 132 extend radially outwardly from a seal-supporting boss 133 mounted around crank axle mounting boss 124. Seal supporting boss 133 has an annular groove 134 for supporting a ring seal 135 which sealingly engages an outer surface of a side cover 137 of assisting apparatus 14.

In this embodiment, a generally ring-shaped large diameter sprocket 136 with a plurality of radially outwardly projecting teeth 138 and an inner peripheral surface 140 is formed as one-piece with the plurality of sprocket mounting members 132. A generally ring-shaped small diameter sprocket 144 with a plurality of radially outwardly projecting teeth 148 and an inner peripheral surface 152 is mounted to the plurality of sprocket mounting members 132 through bolts 156 and spacers 160. An annular drive ring 170 coaxial with crank axle mounting hole 100 has a plurality of splines 174 formed on an inner peripheral surface thereof for nonrotatably engaging complementary splines 178 on the outer peripheral surface of crank axle mounting boss 124 laterally inwardly of seal supporting boss 133. Each spline 174 has a first circumferential side 180, a second circumferential side 182, and a radially innermost side 184 bridging the radially innermost ends of first circumferential side 180 and second circumferential side 182. In this embodiment, first circumferential side 180 and second circumferential side 182 each are flat and perpendicular to the direction of rotation of crank arm assembly 46. Splines 178 on crank axle mounting boss 124 have the same structure. Of course, other shapes and orientations are possible for the splines. Also, drive ring 170 could be formed one-piece with the crank axle mounting boss 124.

The outer peripheral surface of drive ring 170 forms a pair of drive projections 190A and 190B, each having an abutment 192A and 192B, respectively, disposed 180° from each other and facing in the forward direction of rotation of crank arm assembly 46. In other words, abutments 192A and 192B face in the counterclockwise direction in FIG. 2A. Abutments 192A and 192B follow an imaginary straight line extending radially outwardly from the axis of rotation X of crank arm assembly 46 and perpendicular to the outer peripheral surface of crank axle mounting boss 124. The outer peripheral surface of drive ring 170 at the location of intersection with abutments 192A and 192B extends counterclockwise in FIG. 2A at a constant radius of curvature for more than 20° and, in this embodiment, more than 45° until it nears the rear of the following drive projection, whereupon the radius of curvature increases in a nonconcave manner to the tip of the projection. In this embodiment, the outer peripheral surface of drive ring 170 forms a flat ramp up to the tip of the corresponding projection, but it could be arcuate as well. As seen clearly in FIG. 2A, drive projections 190A and 190B extend only slightly from the outer peripheral surface of drive ring 170. Drive projections 190A and 190B clearly have a diameter less than the diameter of inner peripheral surface 152 of small sprocket 144 as well as the diameter of annular seal groove 134.

Figure 2B:
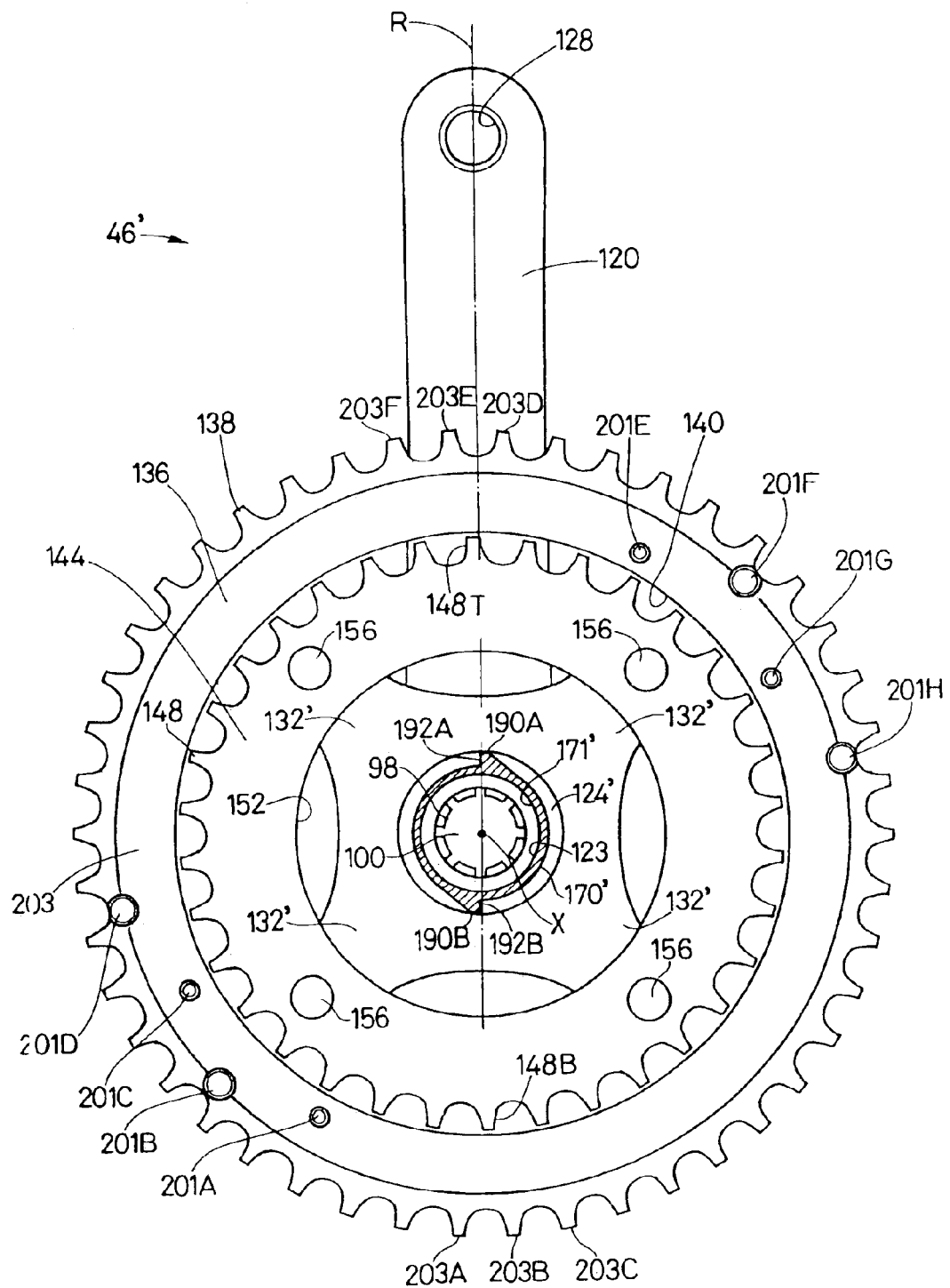
FIG. 2B is an oblique view of an alternative embodiment of a right side crank arm assembly according to the present invention.

The crank arm assembly 46 shown in FIG. 2A has the abutments 192A and 192B oriented generally transverse to a longitudinal median (crank arm) axis R of the crank arm body 120. However, the location of abutments 192A and 192B may be placed in other locations according to the design of the sprockets or for other considerations. For example, FIG. 2B is a side view of an alternative embodiment of a crank arm assembly 46' according to the present invention. This embodiment also has an elongated crank arm body 120, crank axle mounting hole 100, splines 98 and a threaded pedal mounting hole 128. However, in this embodiment a drive ring 170' has a smooth inner peripheral surface 171' that is press-fit onto the outer peripheral surface 123 of a crank arm boss 124'. As with the embodiment shown in FIG. 2A, abutments 192A and 192B follow an imaginary straight line extending radially outwardly from the axis of rotation X of crank arm assembly 46 and perpendicular to the outer peripheral surface of crank axle mounting boss (not shown), which has the same shape as crank axle mounting boss 124 in FIG. 1. However, in this embodiment abutments 192A and 192B extend in a direction parallel to the longitudinal median axis R of crank arm body 120. This allows the abutments to initiate the operation of assist mechanism 14 (described below) when the pedal is at the top or bottom of the pedal stroke.

In this embodiment, four sprocket mounting members 132' extend radially outwardly from crank axle mounting boss 124'. A generally ring-shaped large diameter sprocket 136 with a plurality of radially outwardly projecting teeth 138 and an inner peripheral surface 140 is formed as one-piece with the plurality of sprocket mounting members 132'. A generally ring-shaped small diameter sprocket 144 with a plurality of radially outwardly projecting teeth 148 and an inner peripheral surface 152 is mounted to the plurality of sprocket mounting members 132' through bolts 156 and spacers (not shown) in the same manner as the embodiment shown in FIG. 2A. However, in this embodiment, upshifting chain supporting members 201A–201H are disposed on the side 203 of large diameter sprocket 136 facing small diameter sprocket 144 to lift and guide the chain (not shown) from small diameter sprocket 144 to large diameter sprocket 136. Such chain supporting members 201A–201H are well known, and they may comprise conical members with an inclined surface facing side 203 of large diameter sprocket 136, they may simply comprise cylindrical members protruding from the side 203 of large diameter sprocket 136, or they may comprise some other supporting hook or abutment.

In this embodiment, chain supporting member 201A is located above the third tooth 148 of small diameter sprocket 144 clockwise from the bottom tooth 148B aligned with the longitudinal median axis R; chain supporting member 201B is located above and aligned between the fourth and fifth teeth 148 clockwise from bottom tooth 148B; chain supporting member 201C is located above the sixth tooth 148 clockwise from bottom tooth 148B; and chain supporting member 201D is located above and aligned between the seventh and eighth tooth 148 clockwise from bottom tooth 148B. Similarly, chain supporting member 201E is located above the third tooth 148 clockwise from the top tooth 148T aligned with the longitudinal median axis R; chain supporting member 201F is located above and aligned between the fourth and fifth teeth 148 clockwise from top tooth 148T; chain supporting member 201G is located above the sixth tooth 148 clockwise from top tooth 148T; and chain supporting member 201H is located above and aligned between the seventh and eighth tooth 148 clockwise from top tooth 148T.

Finally, downshift facilitating teeth 203D–203F may be formed on large diameter sprocket 136 to guide the chain onto the smaller diameter sprocket 144 during a downshifting operation. Such downshift facilitating teeth also are well known and may comprise teeth with a side surface inclined and facing the small diameter sprocket 144, teeth rotated relative to the plane of the large diameter sprocket 136, teeth with truncated tops (such as teeth 203A and 203F) and overall smaller teeth commonly called nubs or spurs. In this embodiment downshift facilitating teeth 203A and 203B are disposed on opposite sides of longitudinal median axis R at the bottom of large diameter sprocket 136, and downshift facilitating tooth 203C is disposed immediately counterclockwise of downshift facilitating tooth 203B. Similarly, downshift facilitating teeth 203D and 203E are disposed on opposite sides of longitudinal median axis R at the top of large diameter sprocket 136, and downshift facilitating tooth 203F is disposed immediately counterclockwise of downshift facilitating tooth 203E.

As shown in FIG. 1, left side crank arm assembly 42 includes an elongated crank arm body 220, a crank axle mounting boss 224 at the first end having an inner peripheral surface defining the crank axle mounting hole 99 and splines 86, and a threaded pedal mounting hole 228 on the second end.

Figure 3:
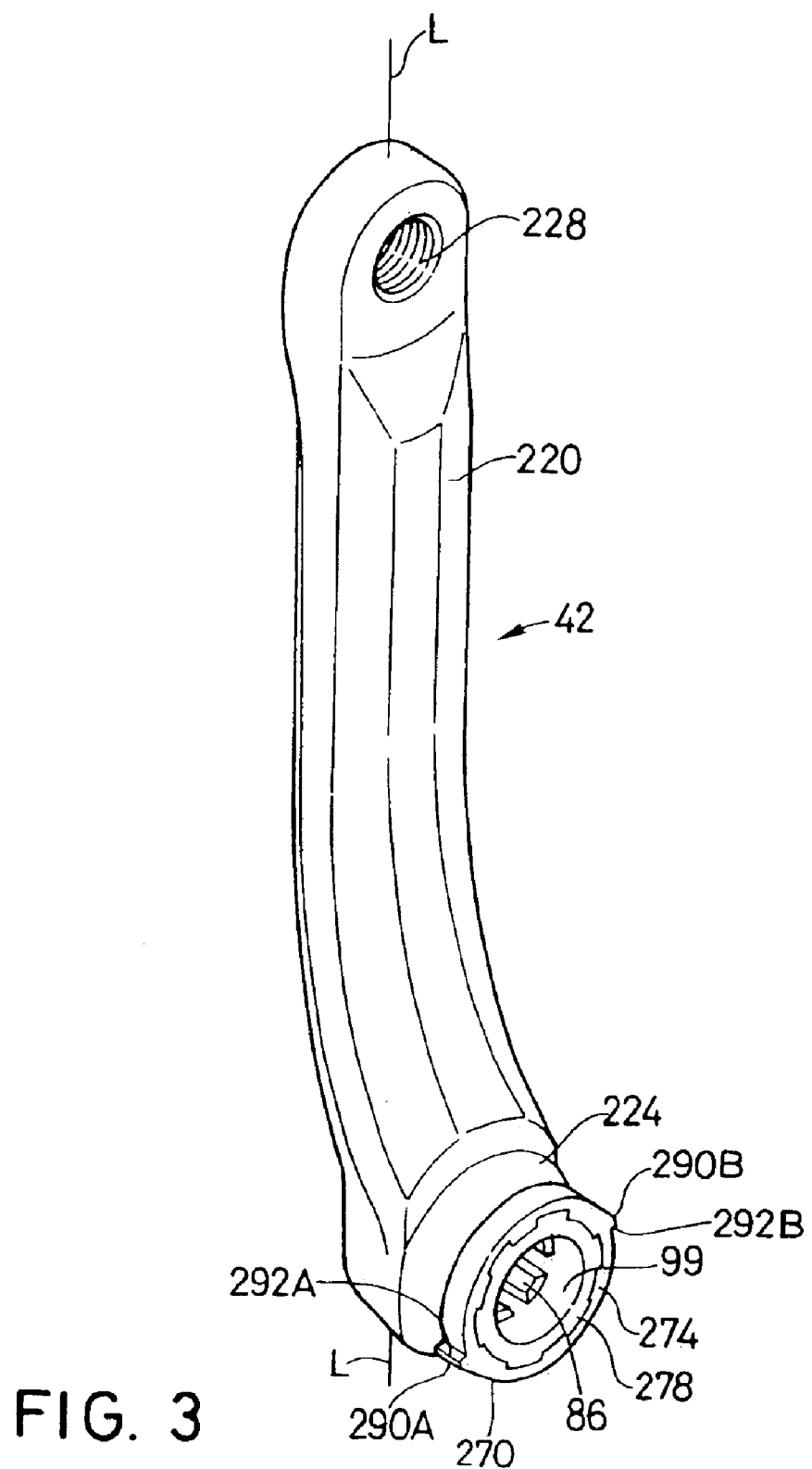
FIG. 3 is an oblique view of an alternative embodiment of a left side crank arm assembly according to the present invention.

Although in this embodiment the assisting apparatus 14 is located on the right side of bottom bracket shell 18, in other embodiments the assisting apparatus 14 may be located on the left side of bottom bracket shell 18. In that case, left side crank arm assembly 42 may be constructed as shown in FIG. 3. In that embodiment an annular drive ring 270 has a plurality of splines 274 formed on an inner peripheral surface thereof for nonrotatably engaging complementary splines 278 on the laterally innermost outer peripheral surface of crank axle mounting boss 224. The structure of crank axle mounting boss 224 and drive ring 270 typically but not necessarily would be the same as crank axle mounting boss 124 and drive ring 170 for right crank arm assembly 46. Furthermore, in this case the diameter of projections 290A and 290B would be not greater than, and preferably less than, an outer diameter of crank arm mounting boss 224 transverse to the longitudinal median axis L of crank arm 220.

Figure 4:
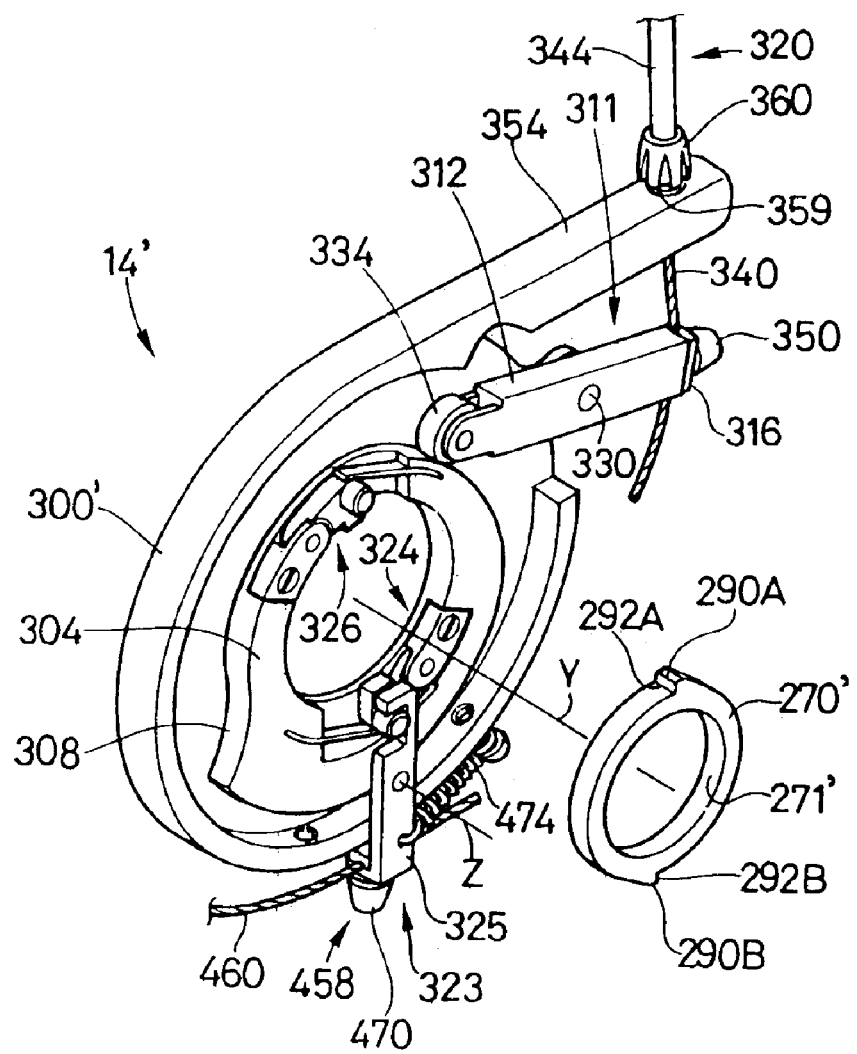
FIG. 4 is an oblique view of a particular embodiment of an assisting apparatus according to the present invention.
Figure 5:
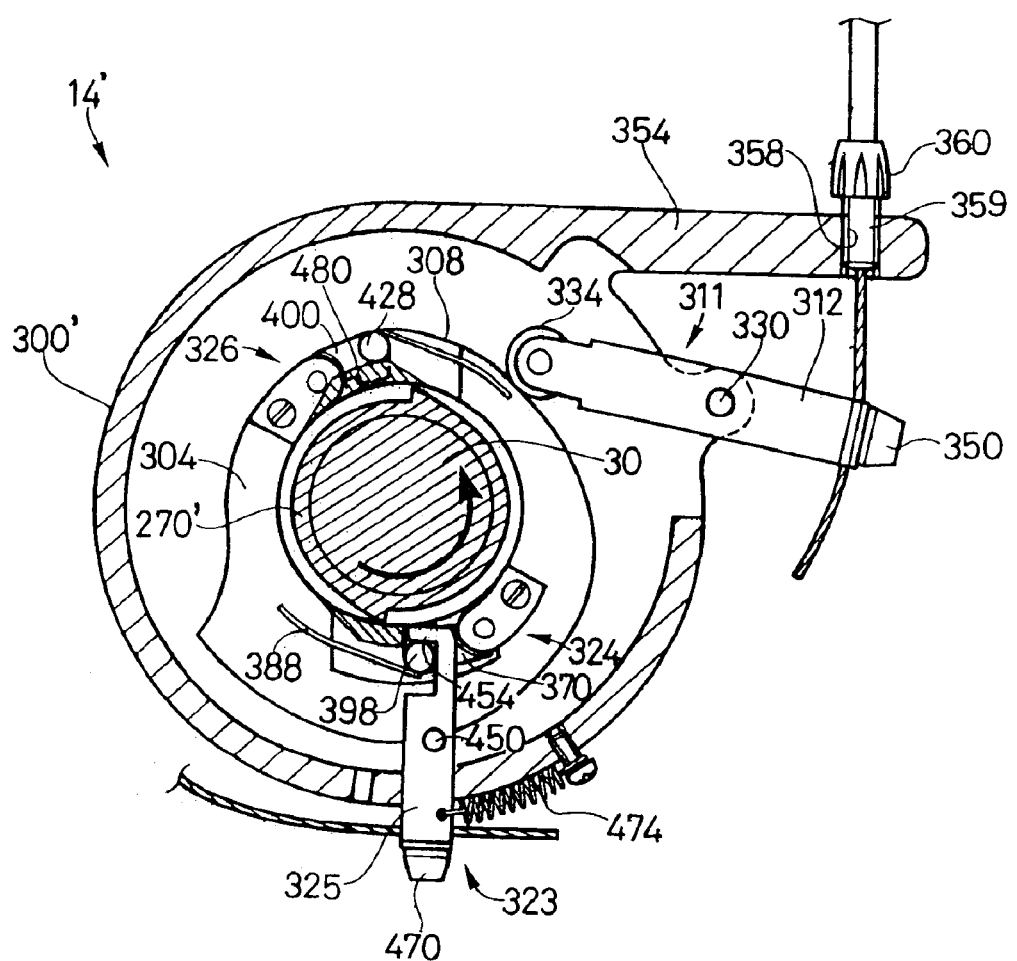
FIG. 5 is a side view of the assisting apparatus of FIG. 4 in an idle state.

FIG. 4 is an oblique view of a particular embodiment of an assisting apparatus 14' according to the present invention. This assisting apparatus 14' is structured the same as assisting apparatus 14 shown in FIG. 1 except it is intended to be mounted on the left side of the bicycle and cooperates with a drive ring 270' which may have the same structure as drive ring 270 shown in FIG. 3, but in FIG. 4 drive ring 270' has a smooth circular inner peripheral surface 271' that can be press-fit onto crank axle 30 as shown in FIG. 5 to facilitate the explanation of the operation of assisting apparatus 14'. In any event, assisting apparatus 14' includes mounting member 300'; a cam member (derailleur positioning cam) 304 with a cam surface 308 coupled to mounting member 300' for rotation around a cam axis Y (which is usually but not necessarily coincident with rotational axis X of crank arm assembly 42); a cam follower 311 cooperating with cam surface 308 for moving in response to rotation of cam member 304; a transmission actuating element coupling member 316 for communicating movement of cam follower 311 to a transmission actuating element 320; a first coupling member 324 coupled for rotation of cam member 304, wherein first coupling member 324 moves between a first engaged position and a first disengaged position; a second coupling member 326 coupled for rotation of cam member 304, wherein second coupling member 326 moves between a second engaged position and a second disengaged position; and an operating member 323 for moving first coupling member 324 to the first engaged position.

In this embodiment, can follower 311 includes a cam follower lever 312, wherein an intermediate portion of cam follower lever 312 is pivotably mounted to mounting member 300' through a pivot shaft 330. A first end of cam follower lever 312 includes a roller 334 for engaging cam surface 308, and a second end of cam follower lever 312 contains the transmission actuating element coupling member 316. Transmission actuating element 320 comprises a Bowden cable wherein a transmission actuating wire 340 slides within an outer casing 344. Consequently, transmission actuating element coupling member 316 has the form of a wire connector, wherein a wire fastening screw 350 screws into the second end of cam follower lever 312. Mounting member 300' has a transmission actuating element coupling arm 354 for terminating the outer casing 344 of transmission actuating element 320 in a known manner. For example, transmission actuating element coupling arm 354 may have a threaded opening 358 (FIG. 5) for engaging a threaded portion 359 of an adjustment barrel 360 used to terminate outer casing 344 and to adjust the position of outer casing 344 relative to transmission actuating wire 340.

Figure 7:
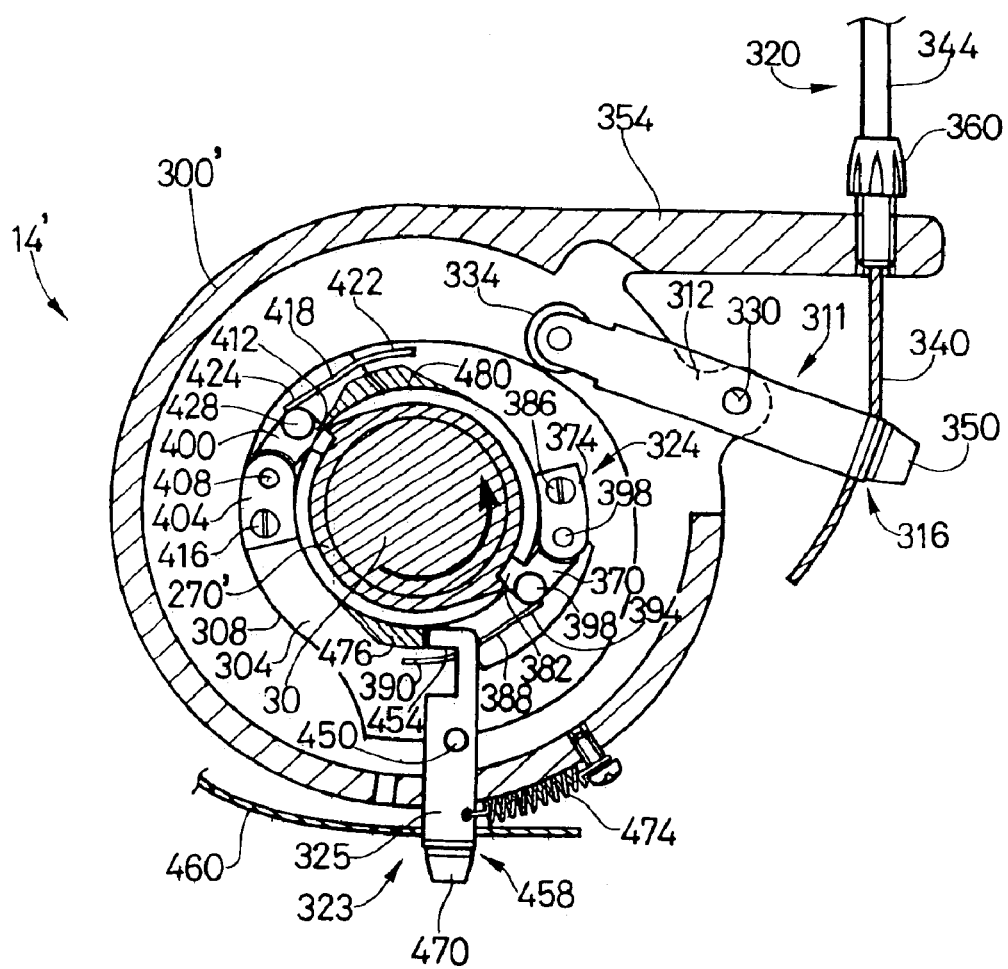
FIG. 7 is a side view of the assisting apparatus of FIG. 4 showing a derailleur positioning cam rotating with the rotating member for pulling a derailleur actuating wire.

As shown more clearly in FIG. 7, which shows cam member 304 rotated counterclockwise relative to the position shown in FIG. 4, first coupling member 324 comprises a first pawl 370 and a first pawl mounting member 374. A first end of first pawl 370 is pivotably connected to first pawl mounting member 374 through a first pivot shaft 378, and a second end of first pawl 370 has a radially inwardly extending first pawl tooth 382. First pawl mounting member 374 is fixed to cam member 304 by a screw 386. A first biasing mechanism in the form of a first leaf spring 388 has a first end 390 fixed to cam member 304 and a second end 394 abutting against a first pawl control abutment 398 disposed at the second end of first pawl 370. First leaf spring 388 biases first pawl tooth 382 radially inwardly to the first engaged position wherein first pawl 370 engages either abutment 292A or 292B on drive ring 270' as discussed below.

Similarly, second coupling member 326 comprises a second pawl 400 and a second pawl mounting member 404. A first end of second pawl 400 is pivotably connected to second pawl mounting member 404 through a second pivot shaft 408, and a second end of second pawl 400 has a radially inwardly extending second pawl tooth 412. Second pawl mounting member 404 is fixed to cam member 304 by a screw 416. A second biasing mechanism in the form of a second leaf spring 418 has a first end 422 fixed to cam member 304 and a second end 424 abutting against a second pawl control abutment 428 disposed at the second end of second pawl 400. Second leaf spring 418 biases second pawl tooth 412 radially inwardly to the second engaged position wherein second pawl 400 engages either abutment 292A or 292B on drive ring 270' as discussed below.

In this embodiment, operating member 323 has the shape of an operating lever 325, wherein an intermediate portion of operating lever 325 is pivotably mounted to mounting member 300' through a pivot shaft 450 for pivoting around an operating lever axis Z. A first end of operating lever 325 has the shape of a hook with a control surface 454 for supporting either first pawl control abutment 398 of first pawl 370 or second pawl control abutment 428 of second pawl 400 as described more fully below. A second end of operating lever 325 contains an operating element coupling member 458. In this embodiment, an operating element in the form of an operating wire 460 is coupled between a shift operating device mounted to the bicycle handlebar (not shown) and operating element coupling member 458. Thus, operating element coupling member 458 has the form of a wire connector, wherein a wire fastening screw 470 screws into the second end of operating lever 325. An operating member biasing spring 474 is connected between mounting member 300' and operating lever 325 for biasing operating lever 325 counterclockwise.

Finally, mounting member 300' includes pawl decoupling ramps 476 and 480 for moving first pawl 370 and second pawl 400 radially outwardly into the first disengaged position and into the second disengaged position to disengage first pawl 370 and second pawl 400 from drive ring 270' as discussed below. Pawl decoupling ramp 476 also functions as a stop to limit the pivoting of operating lever 325 in the counterclockwise direction.

The operation of shift assisting apparatus 14' may be understood by referring to FIGS. 5–12. FIG. 5 shows shift assisting apparatus 14' in a steady-state idle condition. In this condition, control surface 454 of operating lever 325 supports first pawl control abutment 398 so that first pawl tooth 382 is held radially outwardly in the first disengaged position, and pawl decoupling ramp 480 supports second pawl control abutment 428 so that second pawl tooth 412 is held radially outwardly in the second disengaged position. Thus, drive ring 270' rotates together with axle 30 without having any effect on shift assisting apparatus 14'.

Figure 6:
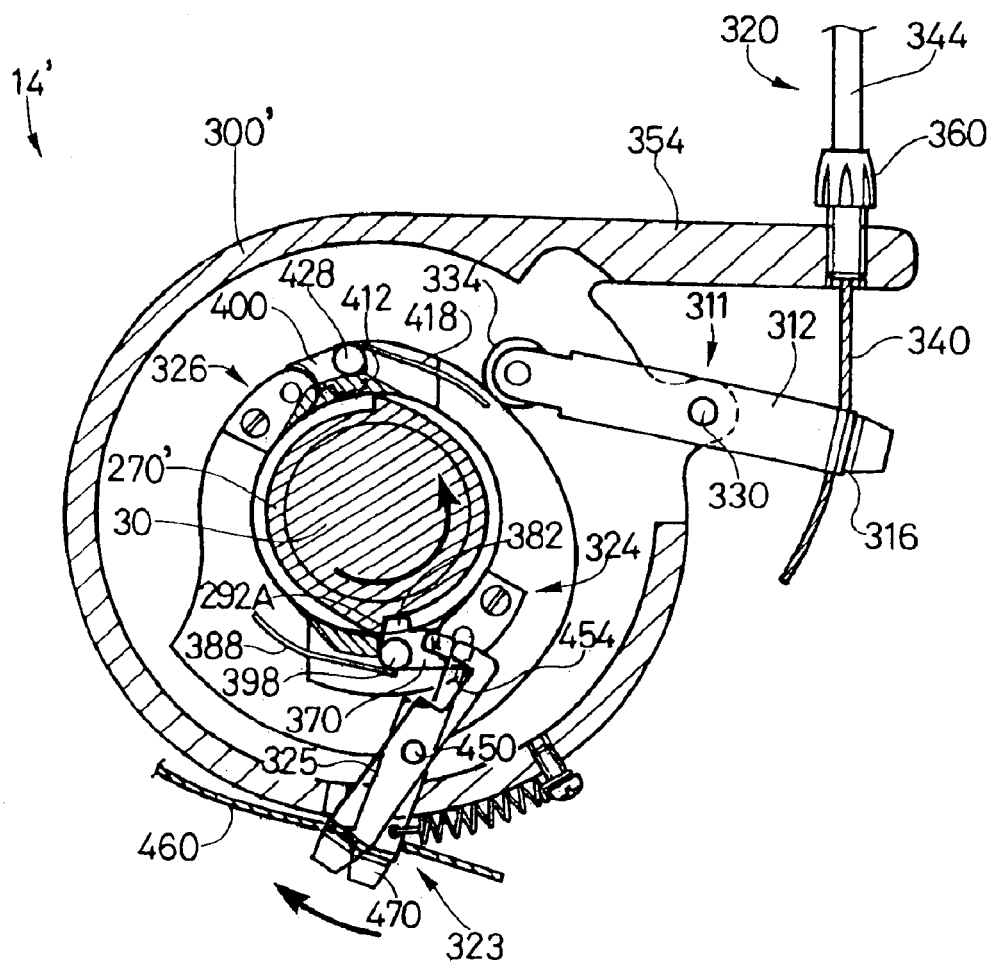
FIG. 6 is a side view of the assisting apparatus of FIG. 4 when an operating wire is moved a first time.

FIG. 6 shows what happens when operating wire 460 is pulled to the left which, in this embodiment, causes the assisting apparatus 14' to move transmission actuating wire 340 in an upshifting direction. Pulling operating wire 460 causes operating lever 325 to rotate clockwise, thus removing control surface 454 from first pawl control abutment 398. As a result, first leaf spring 388 causes first pawl 370 to rotate clockwise, thus moving first pawl tooth 382 radially inwardly into the first engaged position. Consequently, when one of the abutments 292A or 292B of drive ring 270' (e.g., abutment 292A) rotates to the circumferential position of first pawl tooth 382, first pawl tooth 382 contacts the abutment, and cam member 304 rotates counterclockwise together with drive ring 270' and axle 30 to the position shown in FIG. 7. At that time, second pawl control abutment 428 slides off of pawl decoupling ramp 480, and second leaf spring 418 causes second pawl 400 to rotate clockwise so that second pawl tooth 412 moves radially inwardly into the second engaged position to contact the other one of the abutments 292A or 292B (e.g., abutment 292B). Of course, it is not necessary for second pawl tooth 412 to contact any abutment on drive ring 270' as long as cam member 304 is able to rotate under the coupling force of first pawl tooth 382.

Figure 8:
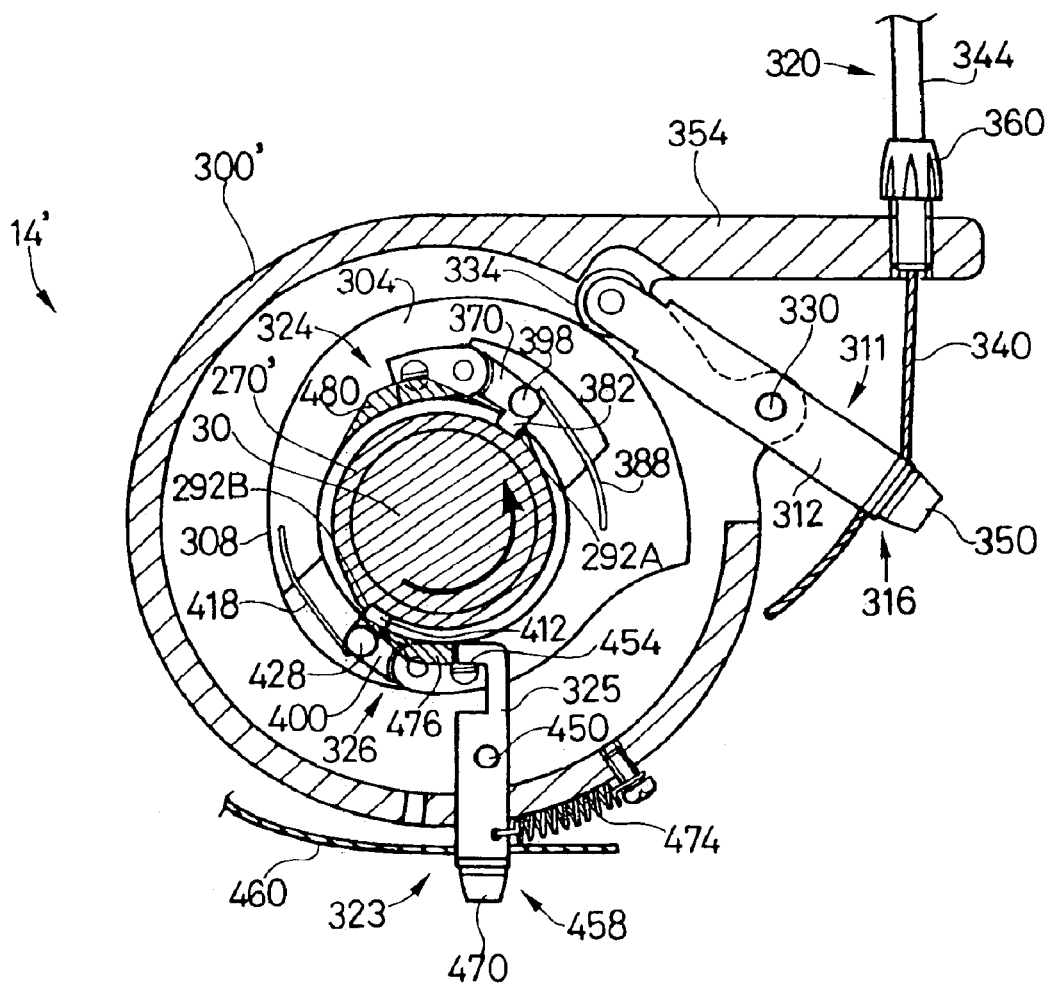
FIG. 8 is a side view of the assisting apparatus of FIG. 4 just prior to disengaging the derailleur positioning cam from the rotating member.

Cam surface 308 has an increasing radius in the clockwise direction, so roller 334 on cam follower lever 312 moves radially outwardly, thus causing transmission actuating element coupling member 316 to pull transmission actuating wire 340. Counterclockwise rotation of cam member 304 continues until cam surface 308 causes cam follower lever 312 to nearly complete the necessary amount of pulling of transmission actuating wire 340 as shown in FIG. 8. At this time, first pawl control abutment 398 is near pawl decoupling ramp 480 and second pawl control abutment 428 is near pawl decoupling ramp 476.

Figure 9:
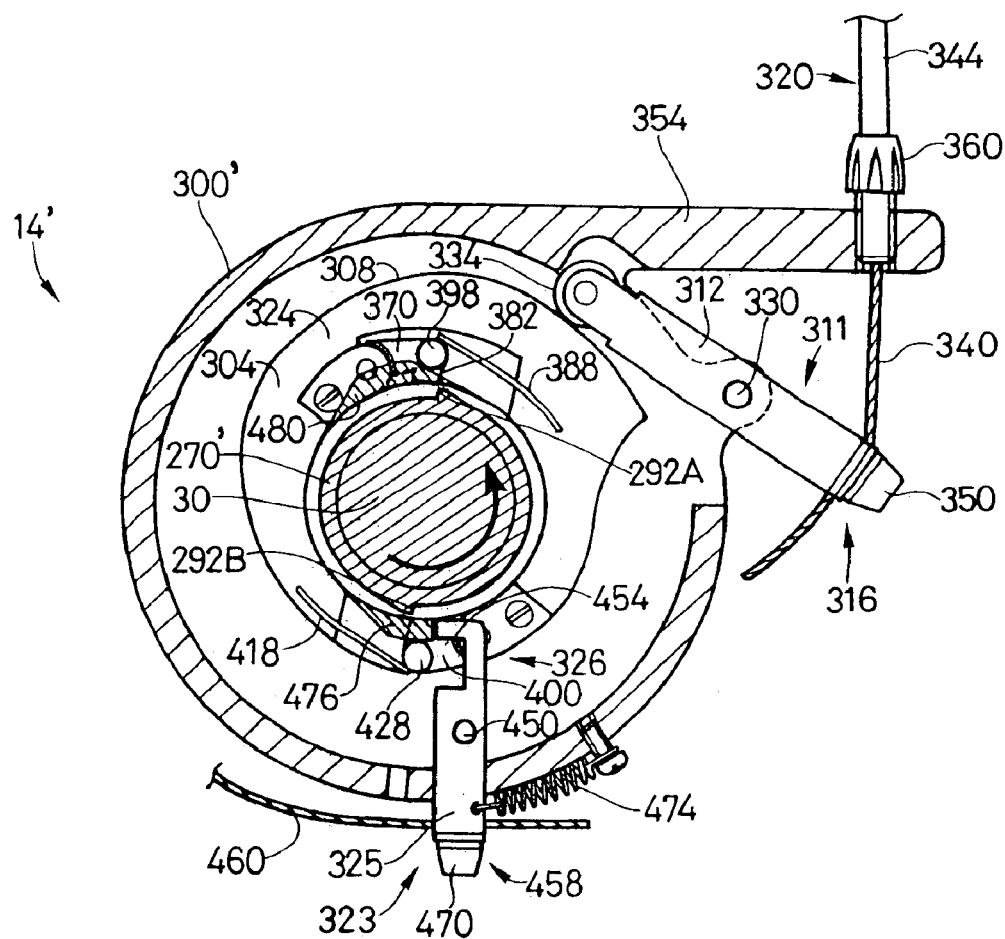
FIG. 9 is a side view of the assisting apparatus of FIG. 4 showing the disengagement of the derailleur positioning cam from the rotating member.
Figure 10:
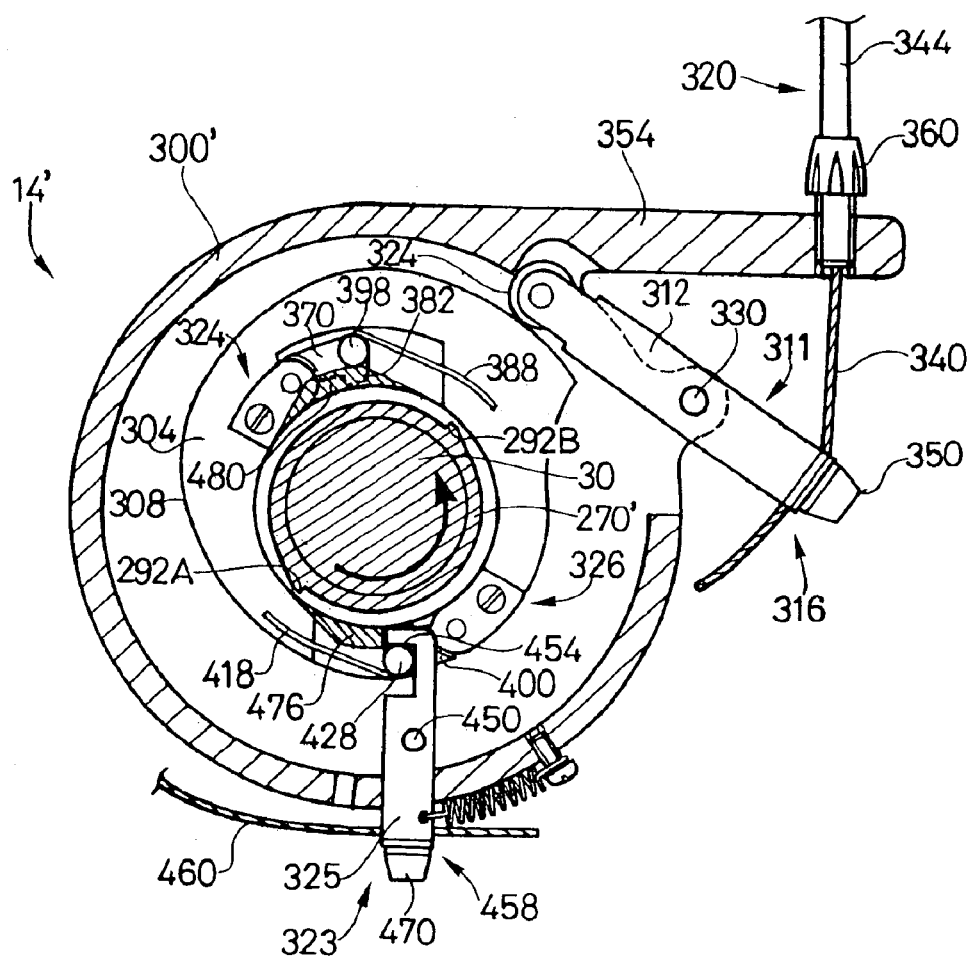
FIG. 10 is a side view of the assisting apparatus of FIG. 4 when the assisting apparatus has completed the shifting operation.

As shown in FIG. 9, as cam member 304 continues to rotate, first pawl control abutment 398 slides up pawl decoupling ramp 480 to move first pawl tooth 382 radially outwardly toward the first disengaged position, and second pawl control abutment 428 slides up pawl decoupling ramp 476 to move second pawl tooth 412 radially outwardly toward the second disengaged position. Thereafter, as shown in FIG. 10, cam member 304 moves slightly until second pawl control abutment 428 is supported in the second disengaged position by control surface 454 of operating lever 325, and first pawl control abutment 398 is supported in the first disengaged position by pawl decoupling ramp 480. At that time, cam member 304 stops rotating, and transmission actuating wire 340 is maintained in the upshifted position.

Figure 11:
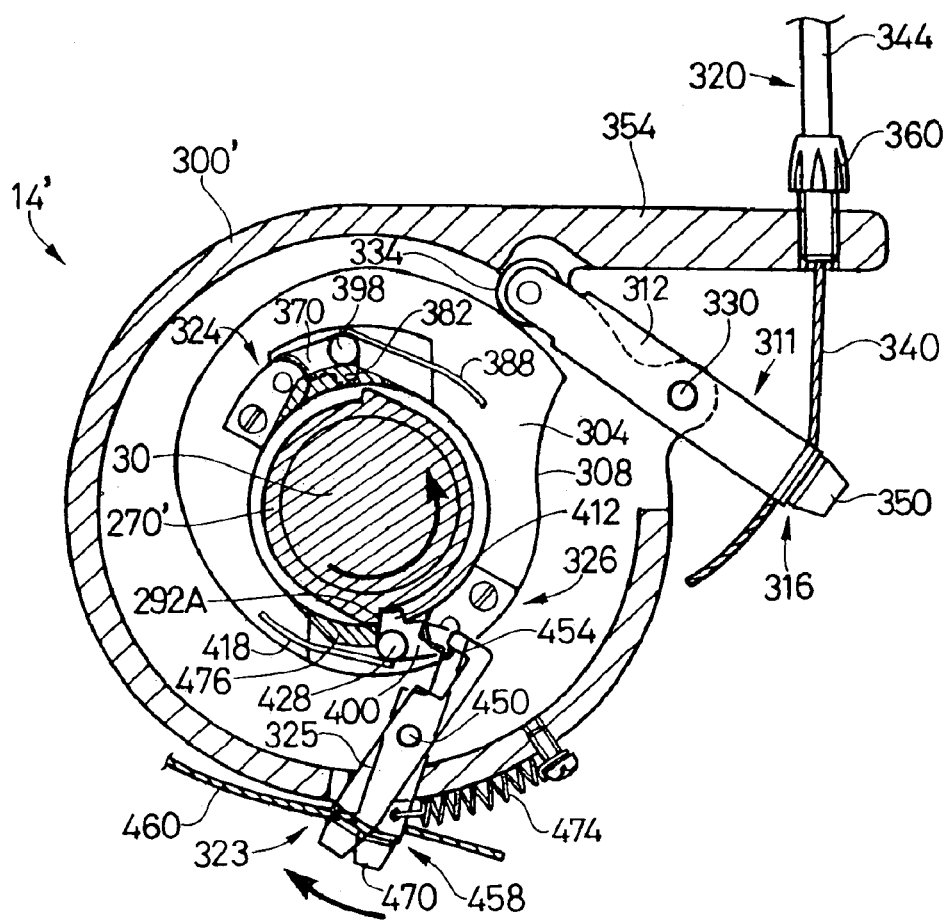
FIG. 11 is a side view of the assisting apparatus of FIG. 4 when the operating wire is moved a second time.
Figure 12:
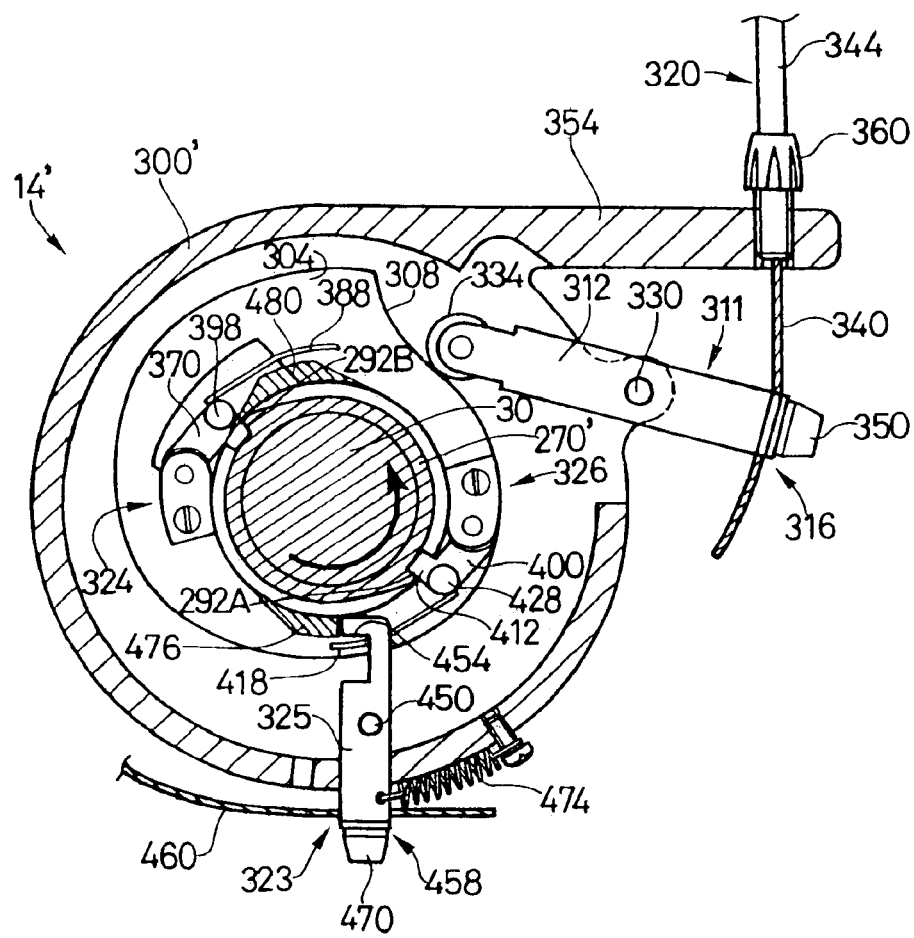
FIG. 12 is a side view of the assisting apparatus of FIG. 4 showing the derailleur positioning cam rotating with the rotating member for releasing the derailleur actuating wire.

To release transmission actuating wire 340 back into the downshifted position, operating wire 460 is pulled once again as shown in FIG. 11. As a result, operating lever 325 again rotates clockwise, thus removing control surface 454 from second pawl control abutment 428. Second pawl 400 rotates clockwise in accordance with the biasing force of second leaf spring 418, thus moving second pawl tooth 412 radially inwardly into the second engaged position. Thus, when one of the abutments 292A or 292B of drive ring 270' (e.g., abutment 292A) rotates to the circumferential position of second pawl 400, second pawl tooth 412 contacts the abutment, and cam member 304 rotates counterclockwise together with drive ring 270' and axle 30 to the position shown in FIG. 12. At the same time, first pawl control abutment 398 slides off of pawl decoupling ramp 480, and first pawl 370 rotates clockwise in accordance with the biasing force of first leaf spring 388 so that first pawl tooth 382 moves radially inwardly into the first engaged position to contact the other one of the abutments 292A or 292B (e.g., abutment 292B).

The radius of cam surface 308 now quickly decreases in the clockwise direction, so roller 334 on cam follower lever 312 moves radially inwardly, thus causing transmission actuating element coupling member 316 to release transmission actuating wire 340. Counterclockwise rotation of cam member 304 continues until assisting apparatus 14' returns to the original position shown in FIG. 5. That is, first pawl control abutment 398 slides up pawl decoupling ramp 476 and is supported by control surface 454 of control lever 325 so that first pawl tooth 382 is held in the first disengaged position. Likewise, second pawl control abutment 428 slides up pawl decoupling ramp 480 and is supported by pawl decoupling ramp 480 so that second pawl tooth 412 is held in the second disengaged position.

Figure 13:
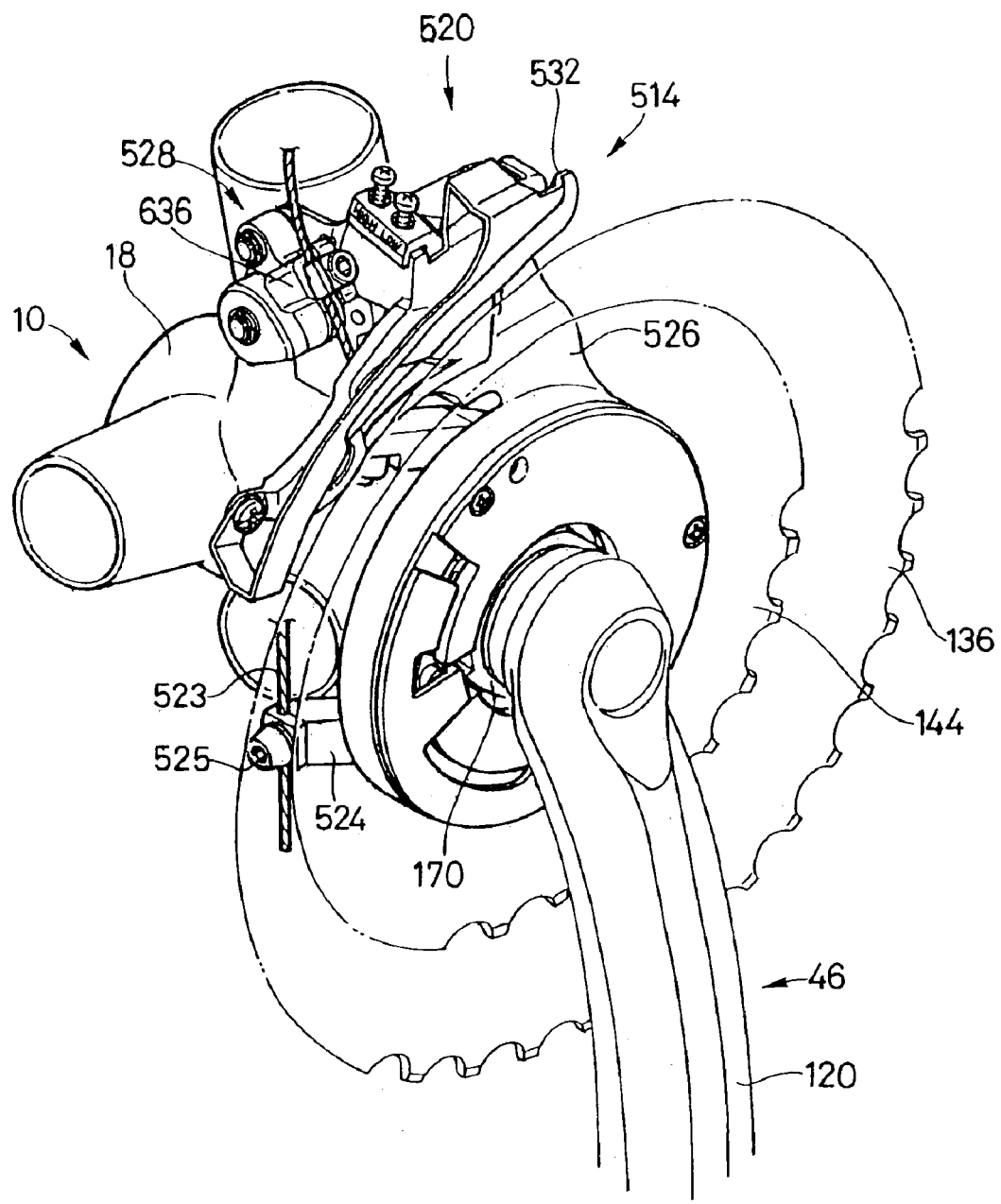
FIG. 13 is an oblique view of a bicycle bottom bracket assembly that incorporates another embodiment of an assisting apparatus according to the present invention for shifting a bicycle transmission.

It should be readily apparent that the embodiment shown in FIGS. 3–12 operates by successive pulling of an operation wire in the same direction to perform both an upshifting and a downshifting operation. FIG. 13 is an oblique view of a bicycle bottom bracket assembly that incorporates another embodiment of an assisting apparatus 514 according to the present invention for shifting a bicycle transmission. The structure of bottom bracket assembly 10 and crank arm assemblies 42 and 46 is the same as in the embodiment shown in FIGS. 1 and 2, so a detailed description of those components shall be omitted. As discussed in more detail below, assisting apparatus 514 upshifts a front derailleur 520 by moving an operating lever 524 clockwise and then downshifts front derailleur 520 by moving operating lever 524 counterclockwise. Operating lever 524 includes a wire coupling 525 for attachment to an operating wire 523 which, in turn, is connected to a shift operating device located at the handlebar (not shown).

In this embodiment, front derailleur 520 is integrally formed with assisting apparatus 514. More specifically, assisting apparatus 514 includes a mounting member 526 that also functions as the base member of front derailleur 520. In all other respects front derailleur 520 has a conventional structure wherein a conventional linkage mechanism 528 is connected between base (mounting) member 526 and a chain guide 532 so that pulling and releasing an actuating arm 536 coupled to linkage mechanism 528 moves chain guide 532 laterally inwardly and outwardly to move a chain (not shown) between large sprocket 136 and small sprocket 144.

Figure 14:
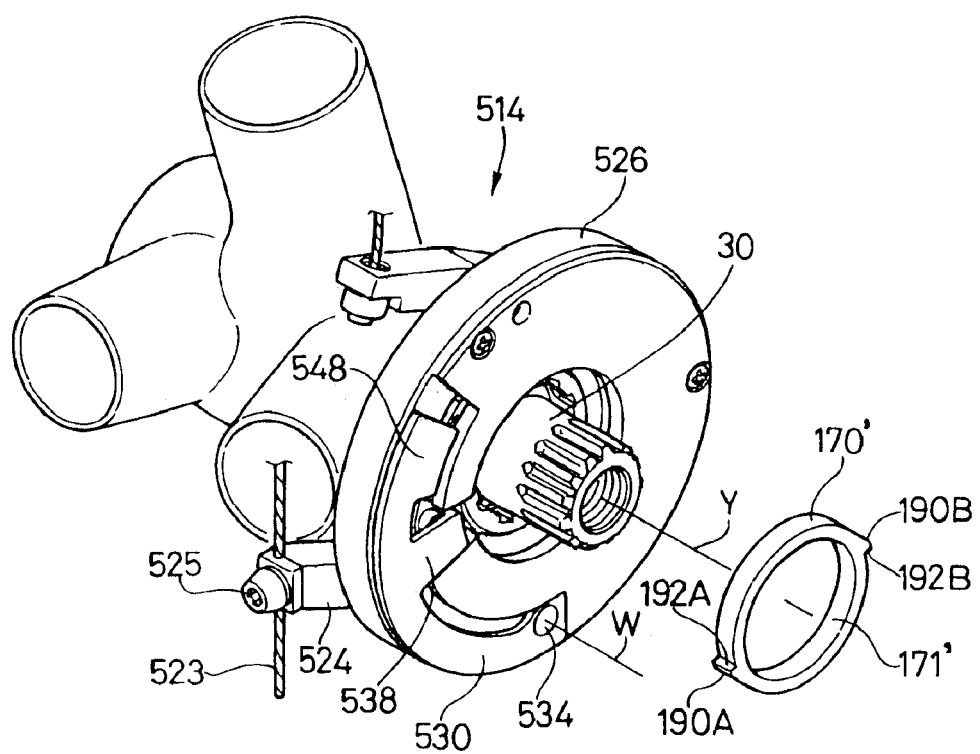
FIG. 14 is an oblique view of the assisting apparatus shown in FIG. 13 with the derailleur and crank arm removed.

FIG. 14 is an oblique view of the assisting apparatus 514 with the derailleur 520 and crank arm assembly 46 removed. As with the first embodiment, a drive ring 170' is shown with a smooth inner peripheral surface 171', and it is shown attached to axle 30 in FIGS. 16–21 to help understand the operation of the device. An arcuate operating lever 530 has a first end pivotably connected to mounting member 526 through a pivot shaft 534 which is also connected to operating arm 524 for pivoting around an operating lever axis W. A spring 535 is disposed around pivot shaft 534 and is connected between mounting member 526 and operating lever 530 for biasing operating lever 530 in the counterclockwise direction. A first control projection 538 extends radially inwardly from an intermediate portion of operating lever 530 and terminates with a laterally inwardly extending first pawl control ledge 542 (FIG. 16) having a radially outwardly facing first pawl control surface 544. Similarly, a second control projection 548 extends radially inwardly from the second end of operating lever 530 and terminates with a laterally inwardly extending second pawl control ledge 552 having a radially inwardly facing second pawl control surface 554.

Figure 15A:
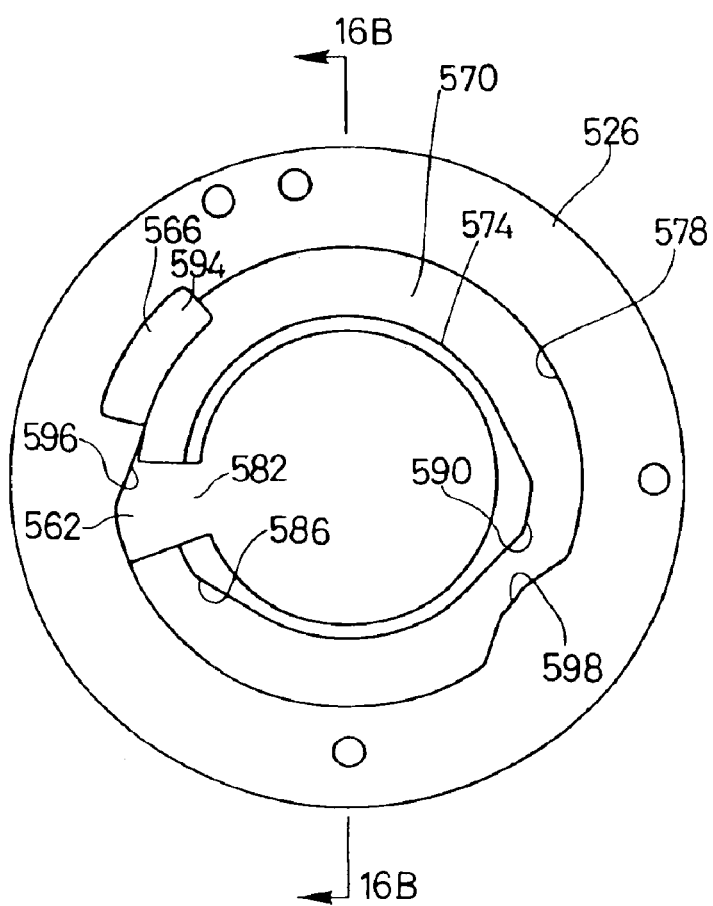
FIG. 15A is a side view of the mounting member used with the assisting apparatus shown in FIG. 13 illustrating the configuration of control surfaces.
Figure 15B:
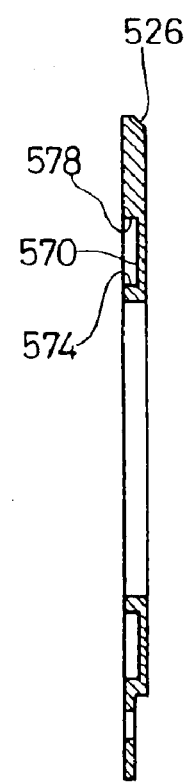
FIG. 15B is a view taken along line 16B—16B in FIG. 15A.

FIGS. 15A and 15B show mounting member 526 in more detail. Mounting member 526 includes a first ledge opening 562 for receiving first pawl control ledge 542 therethrough, a second ledge opening 566 for receiving second pawl control ledge 552 therethrough, and a pawl control groove 570 formed by a radially outwardly facing pawl control surface 574 and a radially inwardly facing pawl control surface 578. Pawl control surface 574 has a generally circular shape except for a first control ledge passage 582 for allowing radially inward movement of first control ledge 542, a pawl decoupling ramp 586 and a pawl decoupling ramp 590. Similarly, pawl control surface 578 has a generally circular shape except for a second control ledge passage 594 for allowing radially outward movement of second control ledge 552, a pawl decoupling ramp 596 and a pawl decoupling ramp 598. The functions of pawl decoupling ramps 586, 590, 596 and 598 will be discussed below.

Figure 16:
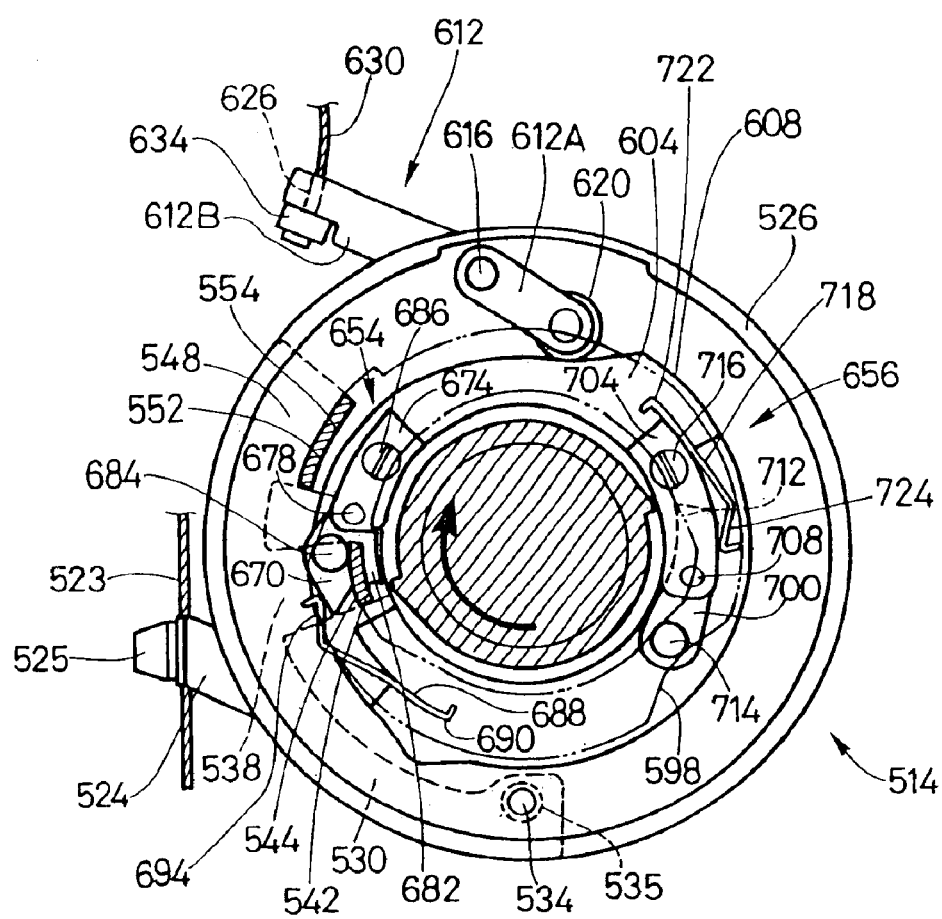
FIG. 16 is a side view of the assisting apparatus shown in FIG. 13 in an idle state.

As shown in FIG. 16, a can 604 having a cam surface 608 is mounted to mounting member 526 for rotation around the axis Y shown in FIG. 14. A cam follower 612 has the form of a two-piece lever (612A, 612B) wherein a first end of lever piece 612A is pivotably mounted to mounting member 526 through a pivot shaft 616 and a second end of lever piece 612A includes a roller 620 for engaging cam surface 608.

Pivot shaft 616 extends through the side of mounting member 526 and is coupled to a first end of lever piece 612B. A second end of lever piece 612B contains a transmission actuating coupling member in the form of an opening 626 for receiving a derailleur actuating wire 630 therethrough. Derailleur actuating wire 630 has a wire end bead 634 for preventing derailleur actuating wire 630 from being pulled upwardly out of opening 626.

As in the first embodiment, a first coupling member 654 is coupled for rotation of the cam member 604, wherein the first coupling member 654 moves between a first engaged position and a first disengaged position; and a second coupling member 656 is coupled for rotation of the cam member 604, wherein the second coupling member 656 moves between a second engaged position and a second disengaged position.

First coupling member 654 comprises a first pawl 670 and a first pawl mounting member 674. A first end of first pawl 670 is pivotably connected to first pawl mounting member 674 through a first pivot shaft 678, and a second end of first pawl 670 has a radially inwardly extending first pawl tooth 682 and a first pawl control abutment 684. First pawl mounting member 674 is fixed to cam member 604 by a screw 686. A first biasing mechanism in the form of a first leaf spring 688 has a first end 690 fixed to cam member 604 and a second end 694 abutting against the second end of first pawl 670. First leaf spring 688 biases first pawl tooth 682 radially inwardly to a first engaged position wherein first pawl 670 engages either abutment 192A or 192B on drive ring 170' as discussed below.

Similarly, second coupling member 656 comprises a second pawl 700 and a second pawl mounting member 704. An intermediate portion of second pawl 700 is pivotably connected to second pawl mounting member 704 through a second pivot shaft 708. A first end of second pawl 700 has a radially inwardly extending second pawl tooth 712, and a second end of second pawl 700 has a second pawl control abutment 714. Second pawl mounting member 704 is fixed to cam member 604 by a screw 716. A second biasing mechanism in the form of a second leaf spring 718 has a first end 722 fixed to cam member 604 and a second end 724 abutting against the first end of second pawl 700. Second leaf spring 718 biases second pawl tooth 712 radially inwardly to a second engaged position wherein second pawl 700 engages either abutment 192A or 192B on drive ring 170' as discussed below.

The operation of shift assisting apparatus 514 may be understood by referring to FIGS. 16–21. FIG. 16 shows shift assisting apparatus 514 in a steady-state idle condition. In this initial condition, first pawl control surface 544 of first pawl control ledge 542 supports first pawl control abutment 684 so that first pawl tooth 682 is held radially outwardly in the first disengaged position, and pawl decoupling ramp 598 presses second pawl control abutment 714 radially inwardly so that second pawl tooth 712 is held radially outwardly in the second disengaged position. Thus, drive ring 170' rotates together with axle 30 without having any effect on shift assisting apparatus 514.

Figure 17:
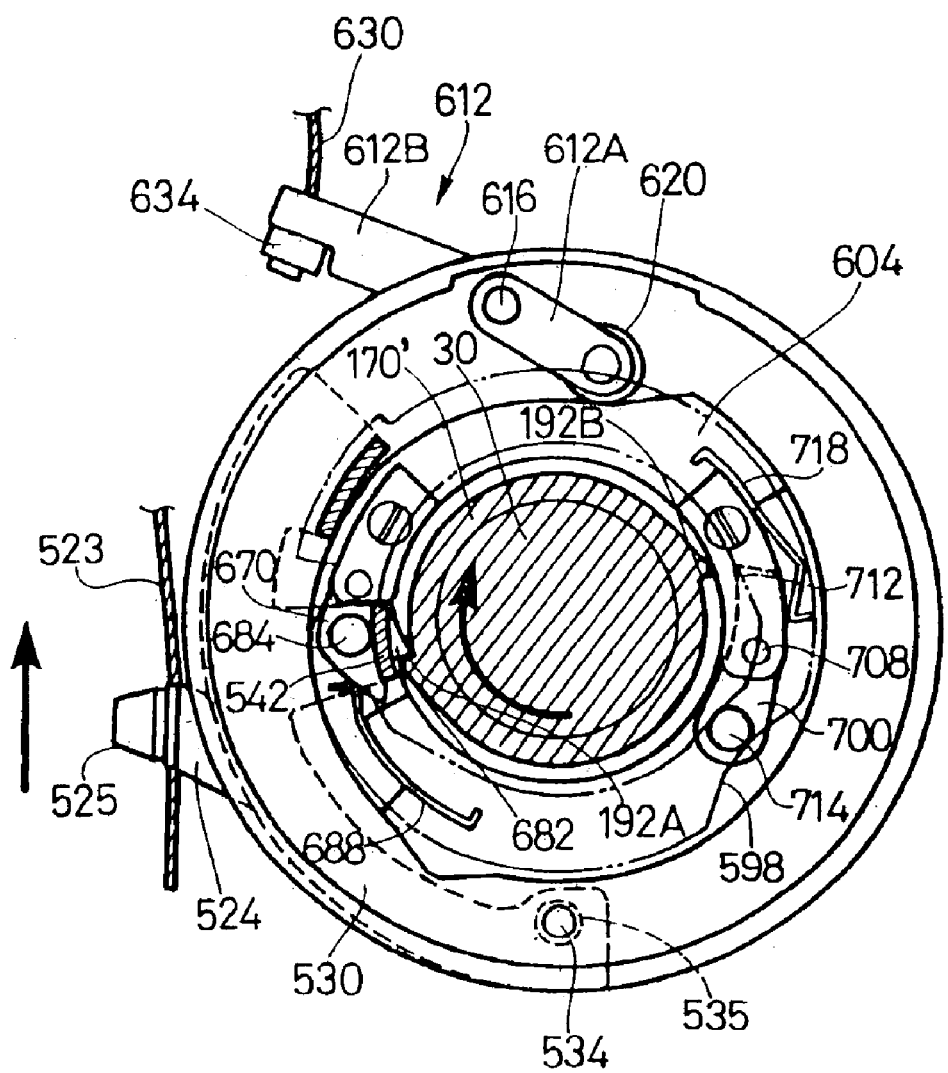
FIG. 17 is a side view of the assisting apparatus shown in FIG. 13 when an operating wire is moved in a first direction.

FIG. 17 shows what happens when operating wire 523 is pulled upwardly. In this case, operating levers 524 and 530 pivot clockwise around pivot shaft 534 against the biasing force of spring 535, and first pawl control ledge 542 allows first pawl control abutment 684 to move radially inwardly. As a result, first pawl 670 rotates counterclockwise in accordance with the biasing force of first leaf spring 688, thus moving first pawl tooth 682 radially inwardly into the first engaged position. Thus, when one of the abutments 192A or 192B of drive ring 170' (e.g., abutment 192A) rotates to the circumferential position of first pawl 670, first pawl tooth 682 contacts the abutment, and cam member 604 rotates clockwise together with drive ring 170' and axle 30 to the position shown in FIG. 18. At the same time, second pawl control abutment 714 slides off of pawl decoupling ramp 598, and second pawl 700 rotates counterclockwise around pivot shaft 708 in accordance with the biasing force of second leaf spring 718 so that second pawl tooth 712 moves radially inwardly into the second engaged position to contact the other one of the abutments 192A or 192B (e.g., abutment 192B).

Figure 18:
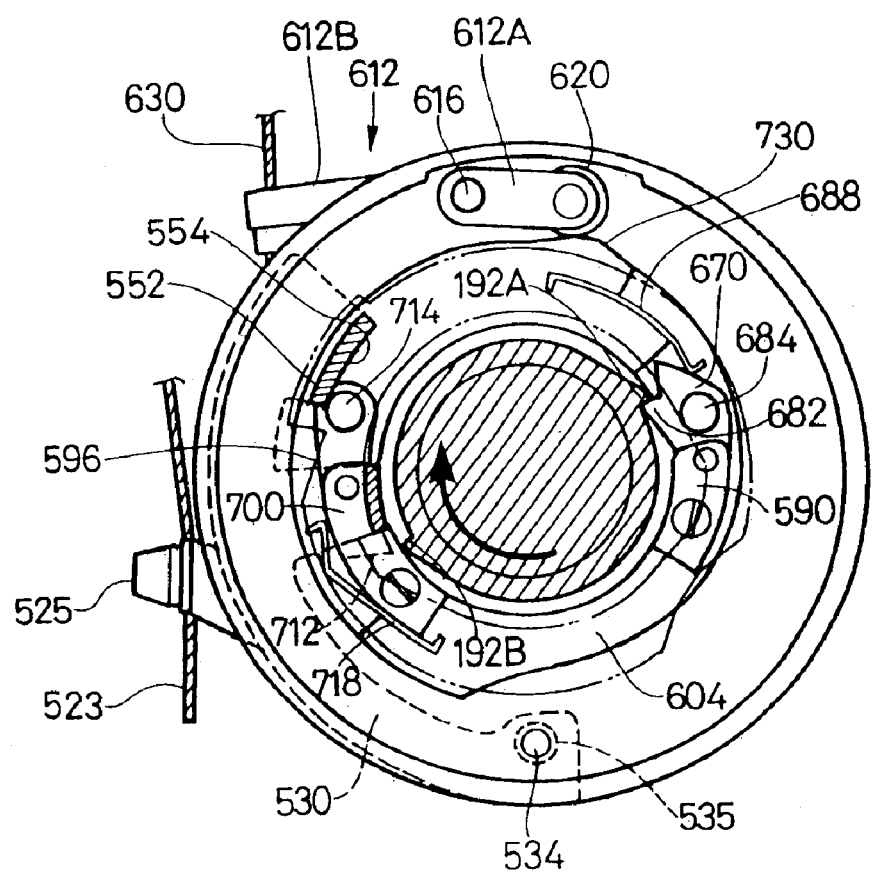
FIG. 18 is a side view of the assisting apparatus of FIG. 13 showing the derailleur positioning cam rotating with the rotating member for pulling the derailleur actuating wire.

Cam surface 608 has an increasing radius in the counterclockwise direction, so roller 620 on lever piece 612A moves radially outwardly, thus causing lever piece 612B to pull actuating wire 630 downwardly. Clockwise rotation of cam member 604 continues until cam surface 608 causes cam follower 612 to nearly complete the necessary amount of pulling of derailleur actuating wire 630 as shown in FIG. 18. At this time, first pawl control abutment 684 is near pawl decoupling ramp 590 and second pawl control abutment 714 slides up pawl decoupling ramp 596 (rotating second pawl 700 clockwise), contacts the second pawl control surface 554 of second pawl control ledge 552 and disengages second pawl tooth 712 from abutment 192B. Also, roller 620 on lever piece 612A is disposed immediately counterclockwise of a cam ridge 730 on cam 604.

Figure 19:
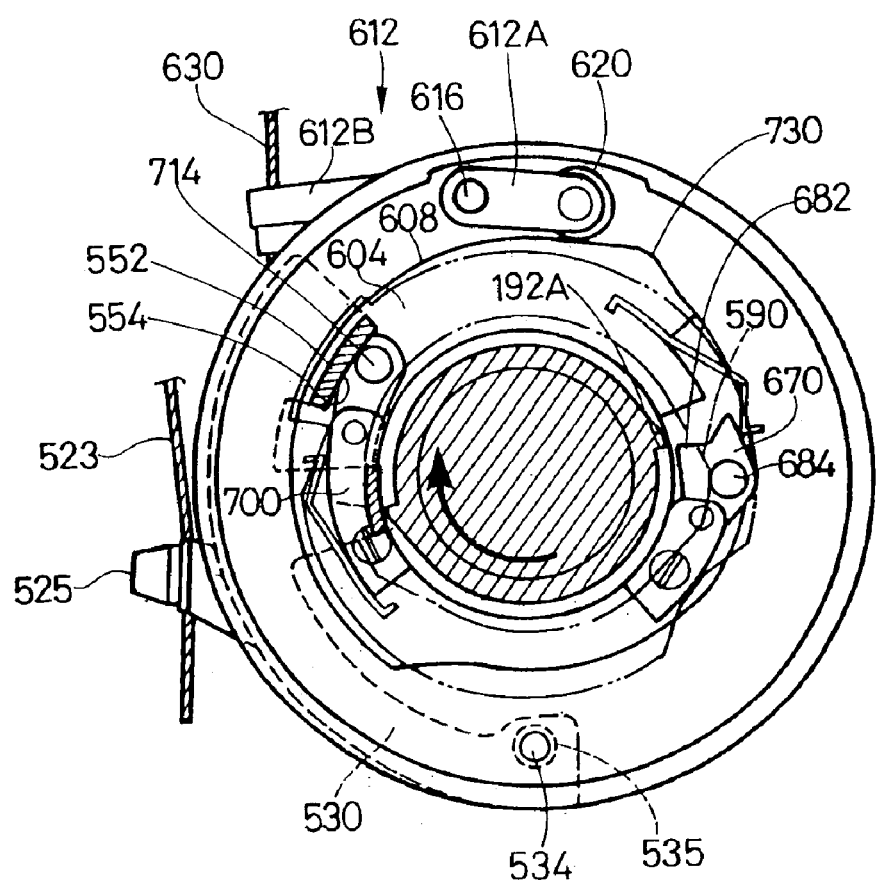
FIG. 19 is a side view of the assisting apparatus of FIG. 13 when the assisting apparatus has completed the shifting operation.

As shown in FIG. 19, as cam member 604 continues to rotate, first pawl control abutment 684 slides up pawl decoupling ramp 590 so that first pawl 670 rotates clockwise and moves first pawl tooth 682 into the first disengaged position. Also, second pawl control abutment 714 moves to the clockwise end of second pawl control surface 554. The radially inward force applied by roller 620 to cam ridge 730 ensures that cam member 604 rotates slightly clockwise so that first pawl control abutment 684 is properly positioned on pawl decoupling ramp 590 and first pawl tooth 682 is disengaged from abutment 192A. At that time, cam member 604 stops rotating and derailleur actuating wire 630 is maintained in the upshifted position.

Figure 20:
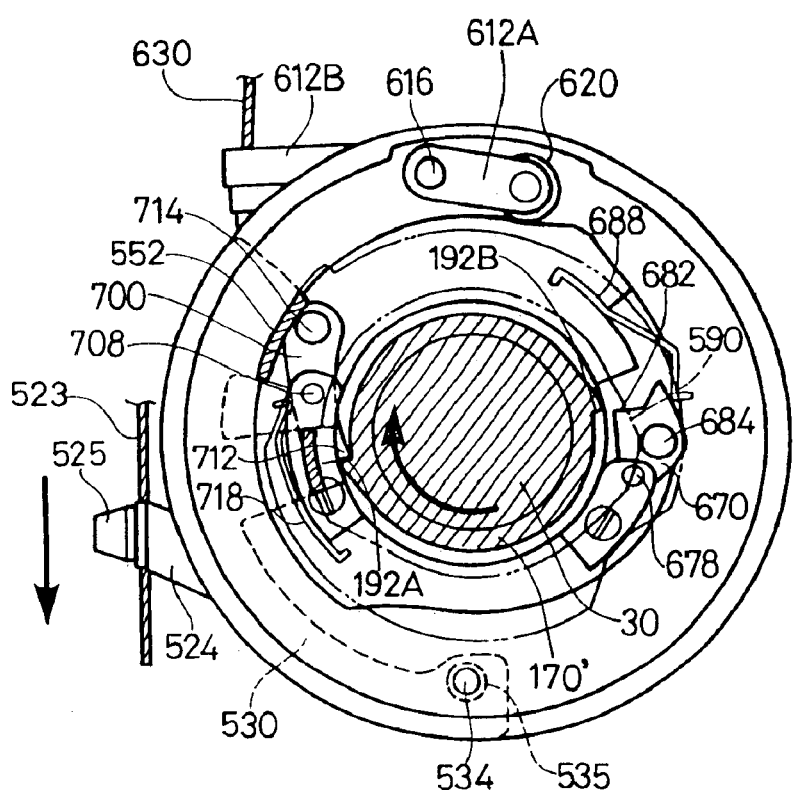
FIG. 20 is a side view of the assisting apparatus shown in FIG. 13 when an operating wire is moved in a second direction.

To release actuating wire 630 to shift the bicycle transmission into the downshifted position, operating wire 523 is released as shown in FIG. 20. In this case, operating levers 524 and 530 pivot counterclockwise around pivot shaft 534 in accordance with the biasing force of spring 535, and second pawl control ledge 552 allows second pawl control abutment 714 to move radially outwardly. As a result, second pawl 700 rotates counterclockwise around pivot shaft 708 in accordance with the biasing force of second leaf spring 718, thus moving second pawl tooth 712 into the second engaged position. Thus, when one of the abutments 192A or 192B of drive ring 170' (e.g., abutment 192A) rotates to the circumferential position of second pawl 700, second pawl tooth 712 contacts the abutment, and cam member 604 rotates clockwise together with drive ring 170' and axle 30 to the position shown in FIG. 21. At the same time, first pawl control abutment 684 slides off of pawl decoupling ramp 590, and first pawl 670 rotates counterclockwise around pivot shaft 678 in accordance with the biasing force of first leaf spring 688 so that first pawl tooth 682 moves radially inwardly into the first engaged position to contact the other one of the abutments 192A or 192B (e.g., abutment 192B).

Figure 21:
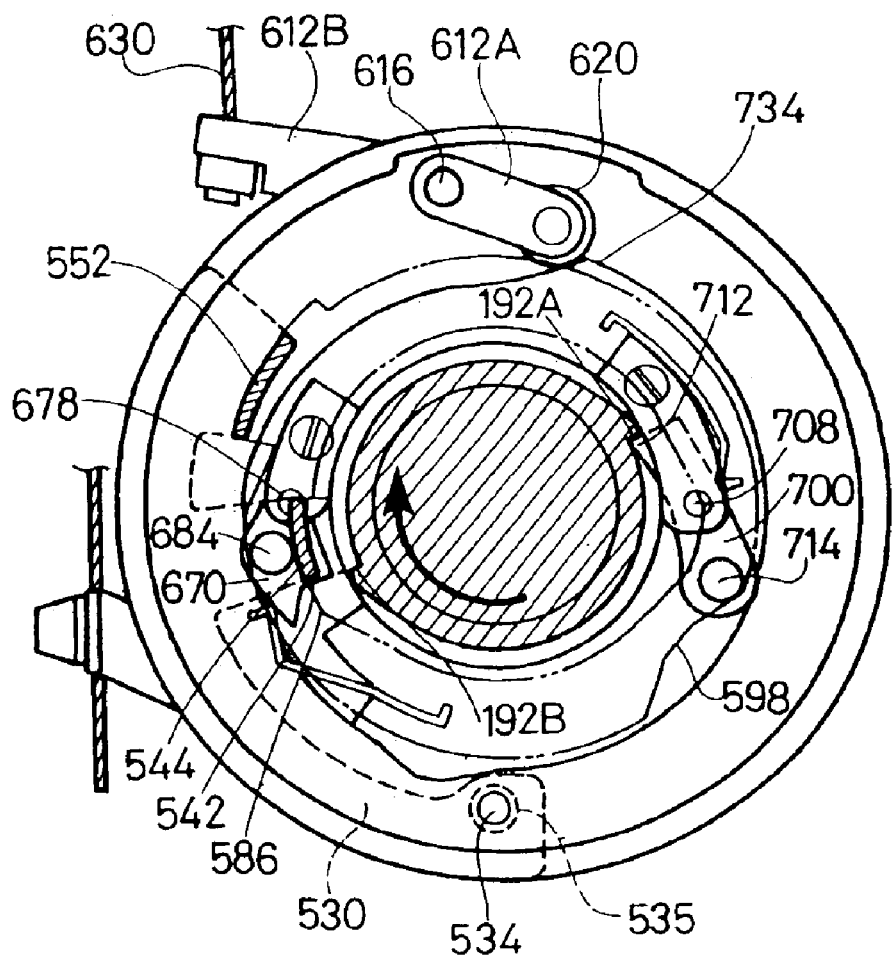
FIG. 21 is a side view of the assisting apparatus of FIG. 13 showing the derailleur positioning cam rotating with the rotating member for releasing the derailleur actuating wire.

This portion of cam surface 608 contacting roller 620 has a decreasing radius in the counterclockwise direction as shown in FIG. 21, so roller 620 on lever piece 612A moves radially inwardly, thus causing lever piece 612B to release derailleur actuating wire 630. Clockwise rotation of cam member 604 continues until cam surface 608 causes cam follower 612 to nearly complete the necessary amount of releasing of actuating wire 630 as shown in FIG. 21. At this time, second pawl control abutment 714 is near pawl decoupling ramp 598, and first pawl control abutment 684 slides up pawl decoupling ramp 586 (thus rotating first pawl 670 clockwise), contacts the first pawl control surface 544 of first pawl control ledge 542 and disengages first pawl tooth 682 from abutment 192B. Also, roller 620 on cam follower lever 612 is disposed immediately counterclockwise of a cam ridge 734 on cam 604.

As cam member 604 continues to rotate, second pawl control abutment 714 slides up pawl decoupling ramp 598 so that second pawl 700 rotates clockwise to move second pawl tooth 712 into the second disengaged position, and first pawl control abutment 684 moves to the clockwise end of first pawl control surface 544. The radially inward force applied by roller 620 to cam ridge 734 ensures that cam member 604 continues rotating until second pawl control abutment 714 is properly positioned on pawl decoupling ramp 598 and second pawl tooth 712 is disengaged from abutment 192A. At that time, cam member 604 stops rotating, and actuating wire 630 is maintained in the upshifted position as shown by the initial position in FIG. 16.

Figure 22:
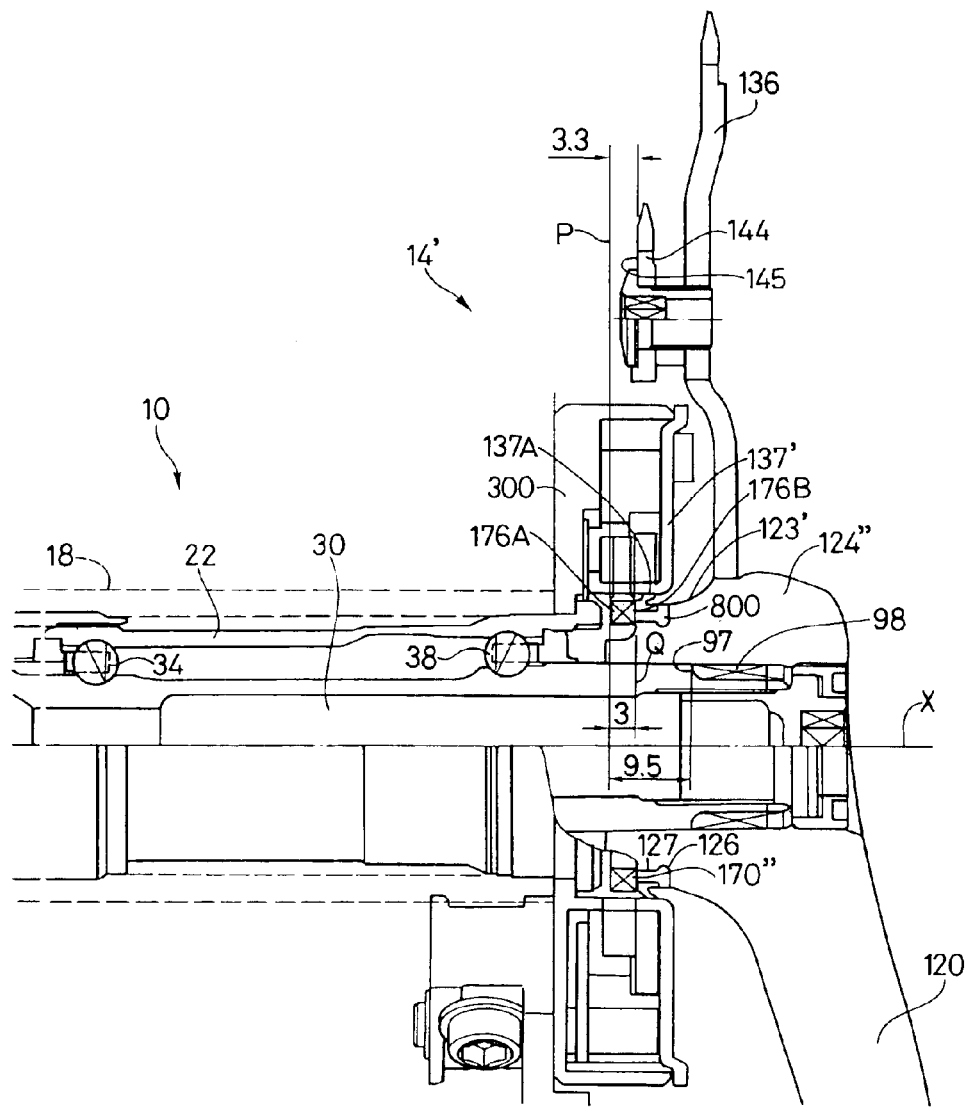
FIG. 22 is a partial cross sectional view of a bicycle bottom bracket assembly that incorporates an alternative embodiment of an assisting apparatus according to the present invention for shifting a bicycle transmission.

FIG. 22 is a partial cross sectional view of a bicycle bottom bracket assembly 10 that incorporates another embodiment of an assisting apparatus 14' according to the present invention for shifting a bicycle transmission. This embodiment may use any of the structures otherwise shown in FIGS. 1–22. The difference between this apparatus and the devices shown in FIGS. 1–22 is primarily in the construction of a crank arm assembly 46" similar but no identical to crank arm assembly 46' shown in FIG. 2B. Thus, the elements which are the same as the elements in FIGS. 1 and 2B have the same reference numbers, and a detailed description of those elements shall be omitted.

In this embodiment, upshifting chain supporting elements 201A, 201B, 201E and 201F are provided, and upshifting chain supporting elements 201B and 201F are located approximately 57.55° clockwise of the longitudinal median axis R of crank arm 120. Downshift facilitating teeth 203× having chamfered side surfaces 203Y are provided immediately clockwise of chain receiving recesses 203Z located approximately 11.74° clockwise of the longitudinal median axis R of crank arm 120. As a result of these structures and their orientation, a drive ring 170" is mounted to a crank axle mounting boss 124" with a specific orientation, wherein drive ring 170" includes drive projections 190A' and 190B' forming abutments 192A' and 192B'.

As with the embodiment shown in FIG. 2B, abutments 192A' and 192B' follow an imaginary straight line extending radially outwardly from the axis of rotation X of crank arm assembly 46" and perpendicular to an outer peripheral surface 123' of crank axle mounting boss 124". However, in this embodiment abutments 192A' and 192B' are located approximately 75° clockwise of the longitudinal median axis R of crank arm body 120. This allows the abutments to time the operation of assist mechanism 14' so that the chain will be in the proper position to take maximum advantage of upshifting chain supporting members 201A, 2011B, 201E and 201F and downshift chain facilitating teeth 203X.

Figure 23:
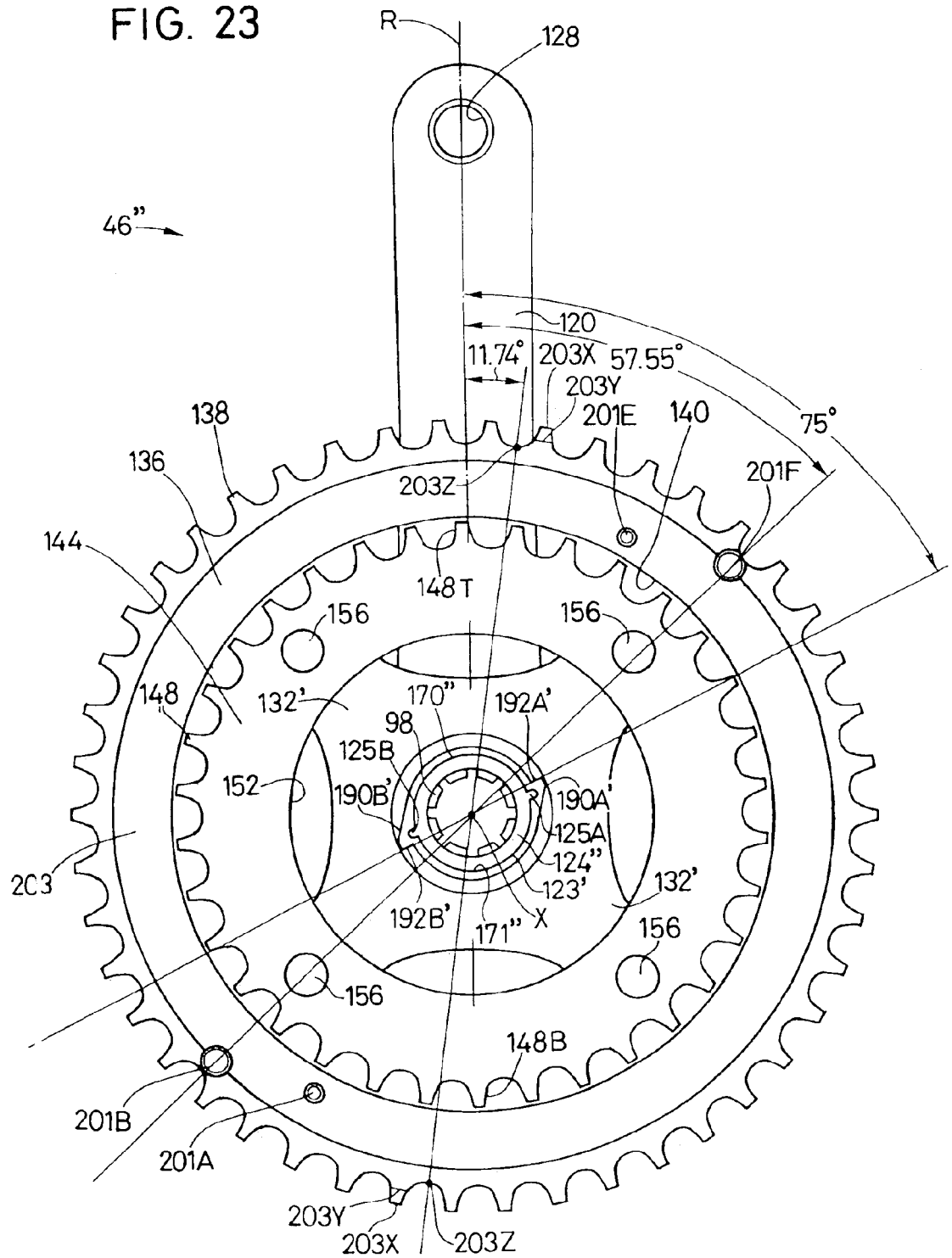
FIG. 23 is a side view of a particular embodiment of a right side crank arm assembly used with the assisting apparatus shown in FIG. 22.
Figure 24:
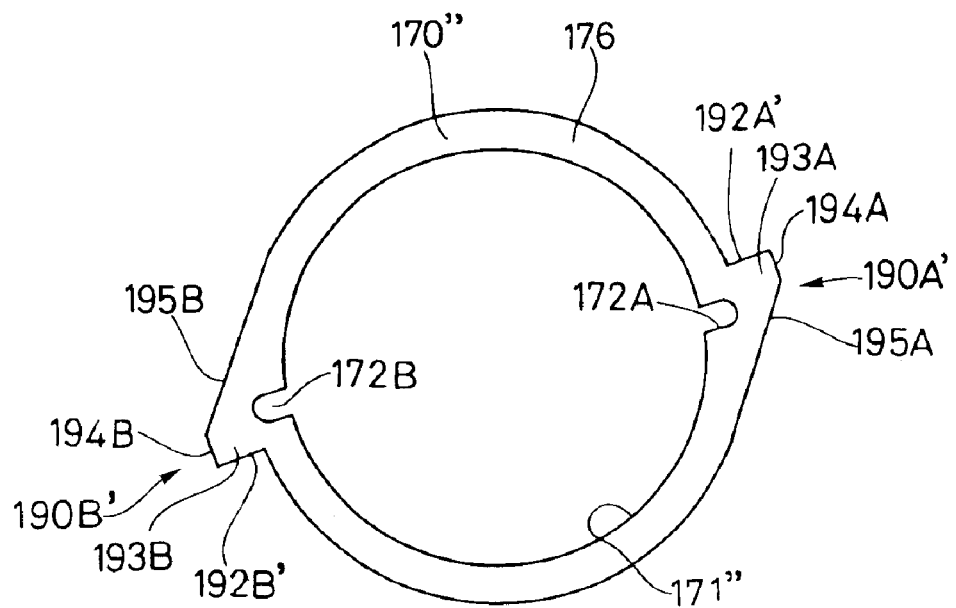
FIG. 24 is a more detailed view of the drive member shown in FIG. 23.

As shown in FIGS. 23 and 24, drive ring 170" has a smooth inner peripheral surface 171" that is press-fit onto the outer peripheral surface 123' of a crank axle mounting boss 124". Inner peripheral surface 171" includes arcuate recesses 172A and 172B that engage corresponding arcuate projections 125A and 125B, respectively, positioned on the outer peripheral surface of 123' of crank axle mounting boss 124' to ensure that drive ring 170' is fitted on crank axle mounting boss 124" so that abutments 192A' and 192B' will have the appropriate mounting angle. To accommodate arcuate recesses 172A and 172B without compromising the strength of drive ring 170" and to keep the diameter of drive ring 170" at a minimum, projections 190A' and 190B' have thickened abutment-forming portions 193A and 193B, respectively, with generally flat top surfaces 194A and 194B. Arcuate recesses 172A and 172B are disposed in these thickened abutment-forming portions 193A and 193B, respectively. Inclined surfaces 195A and 195B extend radially inwardly from the clockwise ends of surfaces 194A and 194B, respectively.

As shown in FIG. 22, drive ring 170" also has a specific relationship to small diameter sprocket 144 and splines 98 in the direction of the rotational axis X. In this embodiment, drive ring 170" has a thickness of 3.0 millimeters in the direction of rotational axis X. A plane P containing an inner side 176A of drive ring 170" is located 3.3 millimeters from an inner side surface 145 of small diameter sprocket 144. Thus, in this embodiment a plane Q containing the outer side 176B of drive ring 170" will be located approximately 0.3 millimeters form the inner side surface 145 of small diameter sprocket 144. Plane P also is located approximately 9.5 millimeters from the innermost ends 97 of splines 98. Preferably, plane P is located at least 5 millimeters from the innermost ends 97 of splines 98.

Figure 25:
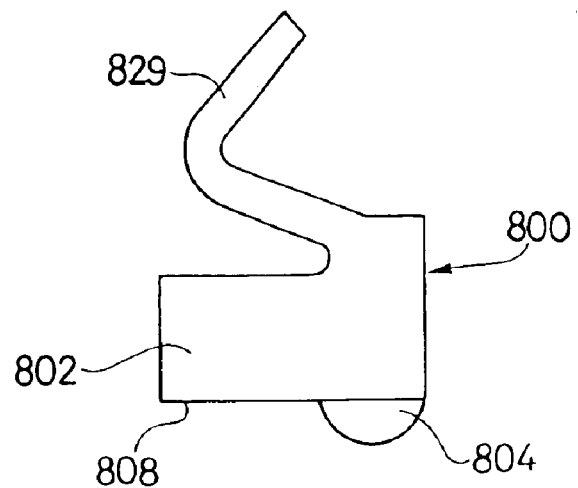
FIG. 25 is a more detailed view illustrating the shape of the sealing member shown in FIG. 23.

In this embodiment, the outer peripheral surface 123' of crank axle mounting boss 124" defines a seal supporting groove 126 and a seal supporting ledge 127 for supporting an annular rubber seal 800. As shown more specifically in FIG. 25, seal 800 has an annular base member 802, wherein base member 802 includes a radially inwardly projecting engaging projection 804 for engaging seal supporting groove 126 and an engaging ledge 808 for engaging seal supporting ledge 127. A lip seal 829 extends radially outwardly from base member 802 for contacting a radially inwardly facing surface 137A of cover 137'. With this sealing structure there is less chance that contaminants falling between crank arm assembly 46" will prematurely wear out the seal.

While the above is a description of various embodiments of the present invention, further modifications may be employed without departing from the spirit and scope of the present invention. For example, the drive projections 190A and 190B also may be formed directly on the lateral side wall or the outer peripheral surface of the crank axle mounting bosses 124 or 224 and project laterally inwardly. The size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A drive mechanism for a bicycle transmission assist mechanism comprising:
    a crank arm having a crank axle mounting hole around a rotational axis;
    wherein the crank arm does not form part of a crank axle dimensioned to extend into a bottom bracket shell of the bicycle;
    a drive member supported coaxial with the rotational axis and including:
        a first abutment facing a forward rotational direction of the crank arm; and
        a first sloped surface extending from a radially outer portion of the abutment and facing a rearward rotational direction of the crank arm; and
    wherein the drive member is not used to couple sprockets to the crank arm.

2. The drive mechanism according to claim 1 wherein the first abutment is substantially perpendicular to an outer peripheral surface of the crank arm.

3. The drive mechanism according to claim 1 wherein the first sloped surface has an arcuate shape.

4. The drive mechanism according to claim 1 wherein the drive member is coaxial with the rotational axis.

5. The drive mechanism according to claim 1 wherein the drive member is one-piece with the crank arm.

6. The drive mechanism according to claim 1 wherein the drive member comprises an annular drive ring mounted around the rotational axis.

7. The drive mechanism according to claim 1 wherein the drive member includes:
    a second abutment facing the forward rotational direction of the crank arm; and
    a second sloped surface facing the rearward rotational direction of the crank arm.

8. The drive mechanism according to claim 7 wherein the first abutment is located substantially 180° from the second abutment.

9. The drive mechanism according to claim 8 wherein the drive member is coaxial with the rotational axis.

10. The drive mechanism according to claim 9 wherein the drive member is one-piece with the crank arm.

11. The drive mechanism according to claim 10 wherein the first abutment is substantially perpendicular to an outer peripheral surface of the crank arm, and wherein the second abutment is substantially perpendicular to an outer peripheral surface of the crank arm.

12. The drive mechanism according to claim 11 wherein the first sloped surface has an arcuate shape, and wherein the second sloped surface has an arcuate shape.

13. The drive mechanism according to claim 1 wherein the crank arm is a left-side crank arm.

14. The drive mechanism according to claim 9 wherein the drive member comprises an annular drive ring mounted around the rotational axis.

15. The drive mechanism according to claim 14 wherein the first abutment is substantially perpendicular to an outer peripheral surface of the crank arm, and wherein the second abutment is substantially perpendicular to an outer peripheral surface of the crank arm.

16. The drive mechanism according to claim 15 wherein the first sloped surface has an arcuate shape, and wherein the second sloped surface has an arcuate shape.

17. The drive mechanism according to claim 16 wherein an inner peripheral surface of the drive ring includes a plurality of drive ring splines, and wherein an outer peripheral surface of the crank arm includes a plurality of crank arm splines that engage the plurality of drive ring splines.

18. The drive mechanism according to claim 1 wherein the crank arm is a right-side crank arm.

19. The drive mechanism according to claim 1 wherein the rotational axis is disposed at a first end of the crank arm, and further comprising a pedal mounting hole disposed at an opposite second end of the crank arm.

20. The drive mechanism according to claim 1 wherein the crank arm includes a sprocket mounting member for mounting a sprocket to the crank arm.

21. The drive mechanism according to claim 20 wherein the sprocket mounting member comprises four sprocket mounting arms.

22. The drive mechanism according to claim 20 further comprising:
    a large diameter sprocket retained to the sprocket mounting member; and
    a small diameter sprocket retained to the sprocket mounting member.

23. The drive mechanism according to claim 22 wherein a first plane containing an inner side surface of the drive member is disposed laterally inwardly from an inner side surface of the small diameter sprocket.

24. The drive mechanism according to claim 23 wherein a second plane containing an outer side surface of the drive member is disposed laterally inwardly from the inner side surface of the small diameter sprocket.

25. The drive mechanism according to claim 1 further comprising a dust seal disposed along a circumferential surface of the crank arm.

26. The drive mechanism according to claim 1 wherein an inner side surface of the crank arm includes a groove.

27. The drive mechanism according to claim 26 wherein the groove is an annular groove.

28. The drive mechanism according to claim 1 wherein the crank arm has a crank axle mounting hole and a plurality of splines disposed in the crank axle mounting hole, and wherein a plane containing an inner side surface of the drive member is disposed laterally inwardly from laterally inner ends of the plurality of splines.

29. The drive mechanism according to claim 28 wherein the plane is disposed at least 5 millimeters laterally inwardly from the laterally inner ends of the plurality of splines.

30. The drive mechanism according to claim 1 wherein the first abutment extends radially outwardly from a radially outermost surface of the crank arm.

31. The drive mechanism according to claim 1 wherein the first abutment has a free space in front of it sufficient so that the abutment can engage a coupling member of the assist mechanism.

32. A drive mechanism for a bicycle transmission assist mechanism comprising:
   a crank arm having a rotational axis;
   wherein the crank arm does not form part of a crank axle dimensioned to extend into a bottom bracket shell of the bicycle;
   a drive member comprising an annular drive ring mounted around the rotational axis and including:
      a first abutment facing a forward rotational direction of the crank arm; and
      a first sloped surface extending from a radially outer portion of the abutment and facing a rearward rotational direction of the crank arm;
   wherein an inner peripheral surface of the drive ring includes a plurality of drive ring splines, and wherein an outer peripheral surface of the crank arm includes a plurality of crank arm splines that engage the plurality of drive ring splines; and
   wherein the drive member is not used to couple sprockets to the crank arm.

33. The drive mechanism according to claim 32 wherein the first abutment has a free space in front of it sufficient so that the abutment can engage a coupling member of the assist mechanism.

34. A drive mechanism for a bicycle transmission assist mechanism comprising:
   a crank arm having a rotational axis;
   wherein the crank arm does not form part of a crank axle dimensioned to extend into a bottom bracket shell of the bicycle;
   wherein the crank arm includes a sprocket mounting member for mounting a sprocket to the crank arm;
   a large diameter sprocket retained to the sprocket mounting member;
   a small diameter sprocket retained to the sprocket mounting member;
   a drive member including:
      an abutment facing a forward rotational direction of the crank arm; and
      a sloped surface extending from a radially outer portion of the abutment and facing a rearward rotational direction of the crank arm;
   wherein the large diameter sprocket includes a shift assist mechanism for assisting travel of a chain between the small diameter sprocket and the large diameter sprocket; and
   wherein the drive member is not used to couple either the large diameter sprocket or the small diameter sprocket to the crank arm.

35. The drive mechanism according to claim 34 wherein the shift assist mechanism comprises a chain support member disposed on a side surface of the large diameter sprocket facing the small diameter sprocket.

36. The drive mechanism according to claim 34 wherein the abutment has a free space in front of it sufficient so that the abutment can engage a coupling member of the assist mechanism.

37. A drive mechanism for a bicycle transmission assist mechanism comprising:
   a crank arm having a rotational axis;
   wherein the crank arm does not form part of a crank axle dimensioned to extend into a bottom bracket shell of the bicycle;
   a drive member including:
      an abutment facing a forward rotational direction of the crank arm; and
      a sloped surface extending from a radially outer portion of the abutment and facing a rearward rotational direction of the crank arm;
   wherein the drive member is not used to couple sprockets to the crank arm; and
   wherein the crank arm has a crank axle mounting hole, and further comprising a plurality of splines disposed in the crank axle mounting hole.

38. The drive mechanism according to claim 37 wherein the abutment has a free space in front of it sufficient so that the abutment can engage a coupling member of the assist mechanism.

39. A drive mechanism for a bicycle transmission assist mechanism comprising:
   a crank arm having a crank axle mounting hole around a rotational axis;
   wherein the crank arm does not form part of a crank axle dimensioned to extend into a bottom bracket shell of the bicycle:
   a drive member supported coaxial with the rotational axis and including:
      a first abutment facing a forward rotational direction of the crank arm; and
      a first sloped surface extending from a radially outer portion of the abutment and facing a rearward rotational direction of the crank arm;
   wherein the drive member is not used to couple sprockets to the crank arm; and
   wherein an outer peripheral surface of the drive member at a location of intersection with a radially inner portion of the first abutment extends at a substantially constant radius of curvature for more than 20°.

40. A drive mechanism for a bicycle transmission assist mechanism comprising:
   a bicycle crank arm having a crank axle mounting boss including a crank axle mounting hole and a rotational axis;
   wherein the crank arm does not form part of a crank axle dimensioned to extend into a bottom bracket shell of the bicycle;

only two abutments disposed on an outer surface of the crank axle mounting boss and facing a forward rotational direction of the crank arm;

wherein the two abutments rotate coaxially around the rotational axis; and wherein the two abutments are not used to couple sprockets to the crank arm.

41. The drive mechanism according to claim 40 wherein each abutment has a free space in front of it sufficient so that the abutment can engage a coupling member of the assist mechanism.

42. A drive mechanism for a bicycle transmission assist mechanism comprising:

a bicycle crank arm having a crank axle mounting boss including a crank axle mounting hole and a rotational axis;

wherein the crank arm does not form part of a crank axle dimensioned to extend into a bottom bracket shell of the bicycle:

a drive member disposed at the crank axle mounting boss and including:

an outer peripheral surface;

wherein an abutment is disposed on the outer peripheral surface and faces a forward rotational direction of the crank arm;

wherein the abutment rotates around the rotational axis at a substantially constant radius; and wherein the outer peripheral surface at a location of intersection with a radially inner portion of the abutment extends convex for at least 20°; and wherein the drive member is not used to couple sprockets to the crank arm.

43. A drive mechanism for a bicycle transmission assist mechanism comprising:

a crank arm having a rotational axis;

wherein the crank arm does not form part of a crank axle dimensioned to extend into a bottom bracket shell of the bicycle;

a drive member nonrotatably fixed to the crank arm including:

an abutment facing a forward rotational direction of the crank arm;

wherein the abutment rotates around the rotational axis at a substantially constant radius; and a sloped surface extending from a radially outer portion of the abutment and facing a rearward rotational direction of the crank arm; and wherein the drive member is not used to couple sprockets to the crank arm.

44. The drive mechanism according to claim 43 wherein the abutment has a free space in front of it sufficient so that the abutment can engage a coupling member of the assist mechanism.

45. A drive mechanism for a bicycle transmission assist mechanism comprising:

a crank arm having a crank axle mounting hole around a rotational axis;

wherein the crank arm does not form part of a crank axle dimensioned to extend into a bottom bracket shell of the bicycle;

a drive member nonrotatably fixed to the crank arm, wherein the drive member includes an abutment facing a forward rotational direction of the crank arm for engaging a coupling member of the assist mechanism;

wherein the abutment rotates around the rotational axis at a substantially constant radius; and wherein the, drive member is not used to couple sprockets to the crank arm.

46. A drive mechanism for a bicycle transmission assist mechanism comprising:

a crank arm having a crank axle mounting hole around a rotational axis;

wherein the crank arm does not form part of a crank axle dimensioned to extend into a bottom bracket shell of the bicycle;

a sprocket mounting member retained to the crank arm;

a large diameter sprocket retained to the sprocket mounting member;

a small diameter sprocket retained to the sprocket mounting member;

a drive member nonrotatably retained to the crank arm, wherein the drive member includes an abutment facing a forward rotational direction of the crank arm for engaging a coupling member of the assist mechanism;

wherein the drive member is not used to couple sprockets to the crank arm;

wherein the abutment rotates around the rotational axis at a substantially constant radius; and wherein the abutment is visible when the drive member is viewed in a direction along the rotational axis laterally inwardly of the sprocket mounting member.

* * * * *